(12) United States Patent
Johnson et al.

(10) Patent No.: US 7,731,883 B2
(45) Date of Patent: Jun. 8, 2010

(54) METHOD FOR MAKING A TREAD ASSEMBLY

(75) Inventors: Jeffrey L. Johnson, Beaverton, OR (US); Jang Rae Cho, Busan (KR)

(73) Assignee: Nike, Inc., Beaverton, OR (US)

( * ) Notice: Subject to any disclaimer, the term of this patent is extended or adjusted under 35 U.S.C. 154(b) by 569 days.

(21) Appl. No.: 11/422,254

(22) Filed: Jun. 5, 2006

(65) Prior Publication Data
US 2007/0278714 A1    Dec. 6, 2007

(51) Int. Cl.
B29C 45/14 (2006.01)
(52) U.S. Cl. .................. 264/259; 264/19; 264/260; 264/320; 264/331.13; 425/129.2; 425/119; 425/121; 425/544
(58) Field of Classification Search ................ 264/247, 264/259, 19, 260
See application file for complete search history.

(56) References Cited

U.S. PATENT DOCUMENTS

| | | | |
|---|---|---|---|
| 1,405,453 A * | 2/1922 | Somerville | 12/146 BR |
| 2,415,961 A | 2/1947 | Nast | |
| 2,931,110 A | 4/1960 | Pietrocola | |
| 3,175,249 A | 3/1965 | Ferreira | |
| 3,652,757 A * | 3/1972 | Wessel et al | 264/244 |
| 4,309,376 A * | 1/1982 | Ueno et al. | 264/241 |
| 4,632,653 A * | 12/1986 | Plocher | 425/149 |
| 5,725,823 A * | 3/1998 | Finn et al. | 264/247 |
| 6,032,388 A | 3/2000 | Fram | |
| 6,071,454 A * | 6/2000 | Shimizu et al. | 264/250 |
| 6,255,235 B1 * | 7/2001 | Hiraoka et al. | 442/101 |
| 7,007,410 B2 * | 3/2006 | Auger et al. | 36/59 R |
| 7,313,876 B2 | 1/2008 | Morgan et al. | |

FOREIGN PATENT DOCUMENTS

JP    03053917 A  *  3/1991

OTHER PUBLICATIONS

Berins, M. L. (ed) Plastics Engineering Handbook of the Society of the Plastics Industry, 5th ed. New York: Van Norstrand Reinhold, 1991, ISBN 0442317999. Figures 5-20, 9-13, pp. 297.*
Berins, M.L. (ed) Plastics Engineering Handbook of the Society of the Plastics Industry, 5th ed. New York: Van Norstrand Reinhold, 1991, ISBN 0442317999. Figures 5-20, 9-13, pp. 156 and 269-271.
International Preliminary Report on Patentability, mailed Dec. 24, 2008, from PCT Application No. PCDT/US2007/070395.

(Continued)

*Primary Examiner*—Eric Hug
*Assistant Examiner*—Jacob Thomas Minskey
(74) *Attorney, Agent, or Firm*—Plumsea Law Group, LLC

(57) ABSTRACT

A method for making an article of footwear is disclosed. The method can include a number of steps where various molds are used to attach or mold a tread element onto a substrate or matrix lining. The tread element can be formed by compressing a rubber block between various molding members to liquefy and cause the resulting rubber material to flow into at least one lug cavity disposed near the matrix lining. The rubber material eventually enters the lug cavity and becomes attached to the matrix lining.

20 Claims, 19 Drawing Sheets

OTHER PUBLICATIONS

U.S. Appl. No. 11/422,258, filed Jun. 5, 2006.
Information Disclosure Statement filed Feb. 28, 2007 in U.S. Appl. No. 11/422,258.
Information Disclosure Statement filed Feb. 19, 2008 in U.S. Appl. No. 11/422,258.
Office Action mailed Oct. 28, 2008 in U.S. Appl. No. 11/422,258.
Amendment filed Jan. 28, 2009 in U.S. Appl. No. 11/422,258.
Office Action mailed May 6, 2009 in U.S. Appl. No. 11/422,258.
Amendment filed Aug. 6, 2009 in U.S. Appl. No. 11/422,258.
Supplemental Amendment filed Oct. 29, 2009 in U.S. Appl. No. 11/422,258.

* cited by examiner

METHOD FOR MAKING A TREAD ASSEMBLY

BACKGROUND OF THE INVENTION

1. Field of the Invention

The present invention relates generally to articles of footwear, and in particular to a method for creating outsoles.

2. Description of Related Art

Methods for constructing a tread assembly, which is a set of tread elements fixed in place to a thin and flexible matrix lining, such as those used for shoe outsoles, have been previously disclosed.

Fram (U.S. Pat. No. 6,032,388) discloses a method in which an inelastic sheet material is provided with a pattern of perforations through it, and a plurality of tread elements are created. The sheet material is placed in a molding machine with tread forming cavities below the sheet material. Following this, tread material is injected into tread forming cavities. The tread forming material flows out of the tread forming cavities and through the perforated sheet material into molding, cavities that have been secured just under the sheet material. The tread is injected through the perforations in such a manner so that some of the resultant tread elements have anchoring portions extending through the sheet material from an opposite side of the material.

Hiraoka (U.S. Pat. No. 6,562,271) discloses a method in which a male and female mold are engaged with each other in order to form a nonslip member, composed of a base fabric and nonslip convexes. The nonslip convex includes a peripheral edge that reinforces anchoring between the nonslip convex and the base fabric. A plate-like material is inserted between the male and female molds, and by engaging these molds a large number of small pieces coincident to a shape of through holes of the female mold are punched out from a plate-like material. These small pieces are then bridged and fixed to the base fabric to serve as the tread of the nonslip member. This method of manufacturing tread elements includes several steps.

There is currently a need for a method for making a tread assembly that is more efficient, while at the same time, allowing for a great deal of variation or flexibility in terms of the composition of the material that will eventually compose the tread assembly. In particular, a method is needed that can reduce the number of steps used in manufacturing a tread assembly, even complex tread assemblies.

SUMMARY OF THE INVENTION

The present invention is directed to a method of making a tread element. In one aspect, the invention provides a method of making an article of footwear, comprising the steps of: placing a matrix lining between a molding base and a second side of a central mold; placing a rubber block between a molding press and a first side of the central mold; compressing the rubber block between the molding press and the first side of the central mold so that the rubber block becomes viscous and the resulting viscous rubber material flows into at least one lug cavity disposed on the second side of the central mold; wherein the lug cavity is disposed proximate the matrix lining; and wherein the viscous rubber material attaches to the matrix lining.

In another aspect, the matrix lining contacts the second side of the central mold before viscous rubber material flows into the lug cavity.

In another aspect, the compressing step includes the step of moving the molding press towards the central mold.

In another aspect, the rubber block becomes viscous and flows into the lug cavity during the compression step.

In another aspect, a second viscous rubber material, that is different than the first viscous rubber material, flows into a second lug cavity during the compressing step.

In another aspect, the second viscous rubber material has a different color than the first viscous rubber material.

In another aspect, the invention provides a method of making a tread element for an article of footwear, comprising the steps of: placing a matrix lining between a molding base and a second side of a central mold; placing a rubber block between a molding press and a first side of the central mod; and compressing the rubber block between the molding press and the first side of the central mold, so that the rubber block liquefies and flows through at least one injection cavity disposed in the central mold and into at least one lug cavity disposed in the central mold; and where the lug cavity is disposed proximate the matrix lining.

In another aspect, the matrix lining contacts the second side of the central mold before viscous rubber material flows into the lug cavity.

In another aspect, a lower orifice places the lug cavity in fluid communication with the injection cavity, and wherein the lower orifice has a diameter that is less than 3 mm.

In another aspect, a lower orifice places the lug cavity in fluid communication with the injection cavity, and wherein the lower orifice has a diameter that is between 0.5 mm and 1.5 mm.

In another aspect, a lower orifice places the lug cavity in fluid communication with the injection cavity, and wherein the lower orifice has a diameter that is about 1.0 mm.

In another aspect, the lug cavity includes a lug cavity rim that extends around the entire outer periphery of first lug cavity and is in contact with matrix lining under enough pressure so that viscous rubber material is contained by the lug cavity rim.

In another aspect, a pressure imbalance is provided to prevent excess pressure.

In another aspect, a molding recess disposed between the molding press and the central mold creates the pressure imbalance.

In another aspect, a spring disposed between the molding press and the central mold creates the pressure imbalance.

In another aspect, the pressure imbalance is created between the molding press and the central mold and the central mold and the molding base.

In another aspect, a pressure between the molding press and the central mold is less than a pressure between the central mold and the molding base, allowing excess viscous rubber material to escape between the molding press and the central mold.

In another aspect, a second viscous rubber material, that is different than the viscous rubber material, flows into the lug cavity after the viscous rubber material has flowed into the lug cavity.

In another aspect, the second viscous rubber material has a different color than the first viscous rubber material.

In another aspect, the invention provides a method of making a tread element for an article of footwear, comprising the steps of: placing a first rubber block and a second rubber block between a molding press and a second side of the central mold; compressing the first rubber block and the second rubber block between the molding press and the second side of the central mold, so that the first rubber block and the second rubber block liquefy; where first material associated with the first rubber block flows through a first injection cavity disposed in the central mold, the first injection cavity being in fluid communication with a first lug cavity; and where second material associated with the second rubber block flows through a second injection cavity disposed in the central mold, the second injection cavity being in fluid communication with a second lug cavity; and where the first lug cavity and the second lug cavity are disposed proximate the matrix lining.

In another aspect, the first material has a different color than the second material.

In another aspect, the first material and the second material are compressed simultaneously by the same molding press.

In another aspect, the first material and the second material eventually form first and second tread elements, respectively, after the matrix lining is separated from the central mold.

In another aspect, the invention provides a method of making a tread element for an article of footwear, comprising the steps of: forming a first tread element onto a matrix lining by compressing and liquefying a first rubber block; and forming a second tread element onto the first tread element by compressing and liquefying a second rubber block.

In another aspect, the first tread element is different than the second tread element.

In another aspect, the first tread element has a different color than the second tread element.

In another aspect, the first tread element and the second tread element are formed simultaneously by the same compression step.

In another aspect, the first tread element and the second tread element are formed simultaneously by the same central mold.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

A method for creating a tread assembly is disclosed. In particular, this tread assembly may be used as an outsole for an article of footwear. The tread assembly is made of a matrix lining that is joined to various tread elements to provide lightweight grip and support. In some embodiments, the matrix lining may be a synthetic fabric, for example. In many cases, it will be important that the matrix lining be thin, flexible, durable, and lightweight. The tread elements may be convex in shape, but any three dimensional shape is possible. This tread assembly could be used in any type of footwear. This tread assembly is certainly not limited to shoe outsoles, as it may be used to form elements that provide extra grip in gloves and other articles of apparel.

Figure 1:
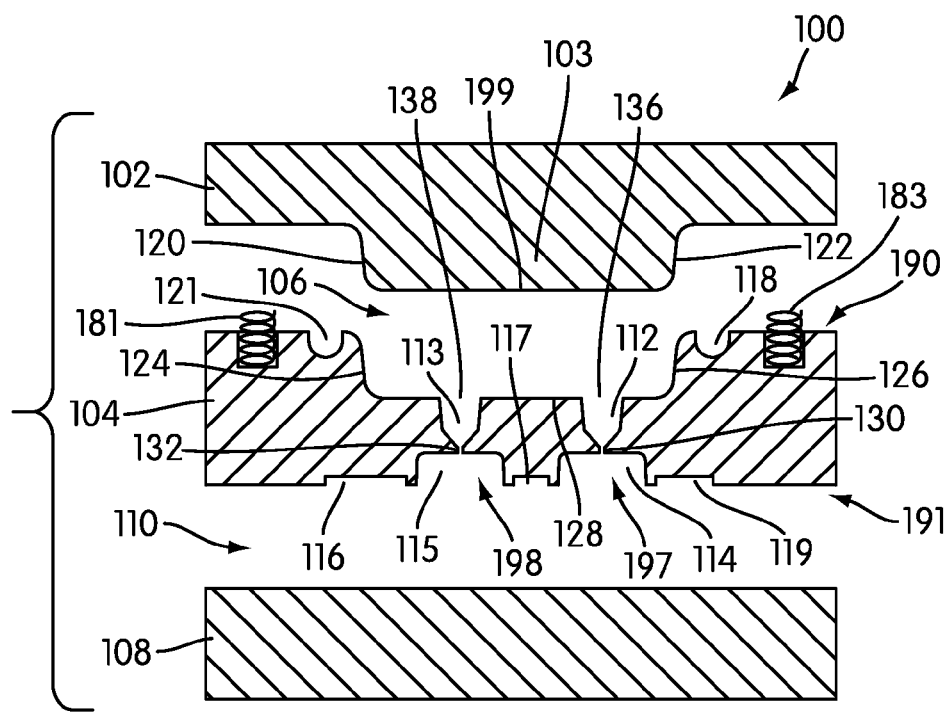
FIG. 1 is a schematic diagram of a preferred embodiment of a molding system.

FIG. 1 is a schematic diagram of a possible embodiment of a manufacturing system 100 used to create a tread assembly. Molding press 102 is disposed adjacent to central mold 104. Molding press 102 includes press extension 103. Press extension 103 includes a pressing surface 199 that extends towards central mold 104. Press extension 103 is formed by first extension wall 120 and second extension wall 122. Press extension 103 can also include other extension walls as well. Press extension 103 corresponds with a central cavity 106 disposed in central mold 104. In a preferred embodiment, central cavity 106 is disposed on second side 190 of central mold 104. Central cavity 106 includes first central cavity wall 124 and second central cavity wall 126 along with central cavity floor 128. Molding press 102 may move independently of central mold 104.

On a first side 191 of central mold 104, a molding base 108 is disposed near central mold 104, forming gap 110. The distance between molding base 108 and central mold 104 can be varied. In particular, both molding press 102 and molding base 108 can be moved closer to central mold 104, in some cases molding press 102 and molding base 108 can be moved to contact central mold 104. In some embodiments, the items comprising manufacturing system 100 can be made of a metallic material.

Central mold 104 includes first injection cavity 112 and second injection cavity 113. Also included in central mold 104 are first lug cavity 114 and second lug cavity 115. Preferably, first lug cavity 114 is in fluid communication with first injection cavity 112 via first lower orifice 130. This arrangement allows a liquid or viscous substance to pass between first injection cavity 112 and first lug cavity 114. Preferably, second lug cavity 115 is in fluid communication with second injection cavity 113 via second lower orifice 132. This arrangement can be similar to the arrangement of first injection cavity 112 and first lug cavity 114. And using that arrangement, a liquid or viscous substance can pass between second injection cavity 113 and second lug cavity 115 through second lower orifice 132.

The diameters of first lower orifice 130 and second lower orifice 132 are constrained by two competing factors. The first factor relates to the amount of flow between first injection cavity 112 and first lug cavity 114. The larger the diameter, the better the flow. However, a second factor must also be considered. In order to obtain an aesthetically pleasing tread element, one that has a minimal amount of excess material or obvious signs of first lower orifice 130, the diameter should be kept as small as possible. In some embodiments, first lower orifice 130 and second lower orifice 132 may comprise diameters less than 3 mm. In a preferred embodiment, first lower orifice 130 and second lower orifice 132 may comprise diameters between 0.5 mm and 1.5 mm. In the exemplary embodiment shown in FIGS. 1 and 2, the diameter of first lower orifice 130 and second lower orifice 132 is about 1.0 mm. Throughout the rest of this specification, any orifice that provides fluid communication between an injection cavity and a lug cavity may be sized according to these considerations. And in preferred embodiments may have diameters between 0.5 mm and 1.5 mm, with 1.0 mm being an exemplary diameter.

In the embodiment shown In FIG. 1 only two injection and lug cavities are shown, however in some embodiments many more injection and lug cavities may be included. In particular, first injection cavity 112 and first lug cavity 114 may be associated with a set of injection and lug cavities that may extend in the direction perpendicular to molding system 100 as seen in FIG. 1.

Regarding the second side 190 of central mold 104, first injection cavity 112 and second injection cavity 113 are in fluid communication with central cavity 106 via first upper orifice 136 and second upper orifice 138 respectively. Central mold 104 can also include first molding recess 118 and second molding recess 121. On the first side 191 of central mold 104, first lug cavity 114 and the second lug cavity 115 are exposed to gap 110 via first lug opening 197 and second lug opening 198. In the embodiment shown in FIG. 1, first lug cavity 114 and second lug cavity 115 are rectangular, however these cavities can assume any shape including, but not limited to, typical shapes found on the outsoles of articles of footwear. In addition, central mold 104 is equipped with first lining recess 116, second lining recess 117 and third lining recess 119.

Figure 2:
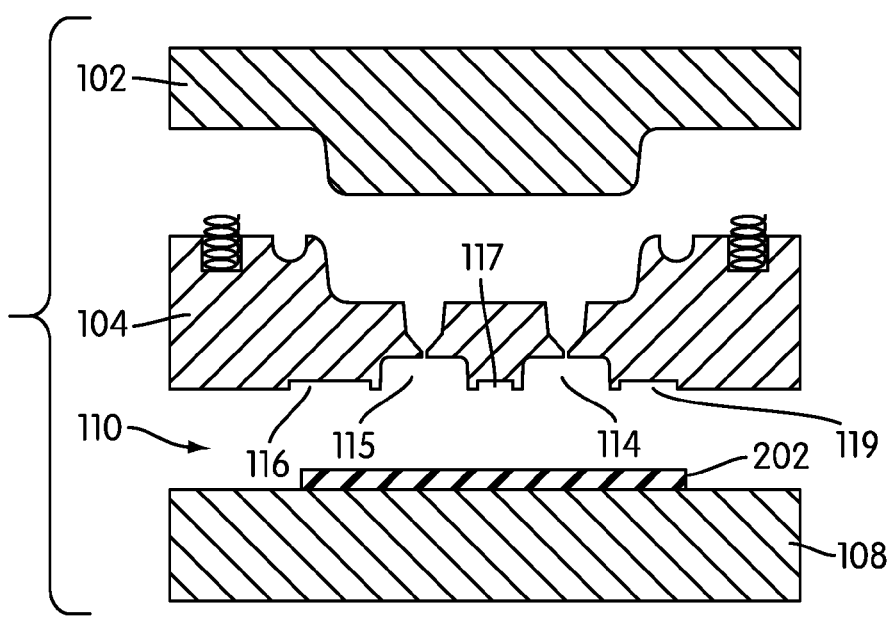
FIG. 2 is a schematic diagram of a preferred embodiment of a molding system with matrix lining attached.

Referring to FIG. 2, a preferred embodiment of a step for making a tread assembly is shown. First, a matrix lining 202 is placed on molding base 108. This can be achieved by sliding matrix lining 202 into place through gap 110, or by first moving molding base 108 away from central mold 104 and then returning molding base 108 after matrix lining 202 has been added. It may be preferable to fix matrix lining 202 in place to assure proper alignment with first lug cavity 114 and second lug cavity 115. In some embodiments, matrix lining 202 may be clamped down to molding base 108 or held down with an adhesive. In a preferred embodiment, matrix lining 202 is placed on molding base 108 in a position where matrix lining 202 is aligned with first lining recess 116, second lining recess 117, and third lining recess 119.

Matrix lining 202 represents any suitable material. In some embodiments, matrix lining 202 may be composed of any of the following materials, either singularly or as a composition of two or more of the following materials: un-buffered textile, leather, synthetic material, suede, or an open mesh. In general, matrix lining 202 may be composed of any type of material used in manufacturing uppers. In a preferred embodiment, matrix lining 202 is composed of a buffered textile. Throughout the specification other matrix linings may also be composed of these materials.

Figure 3:
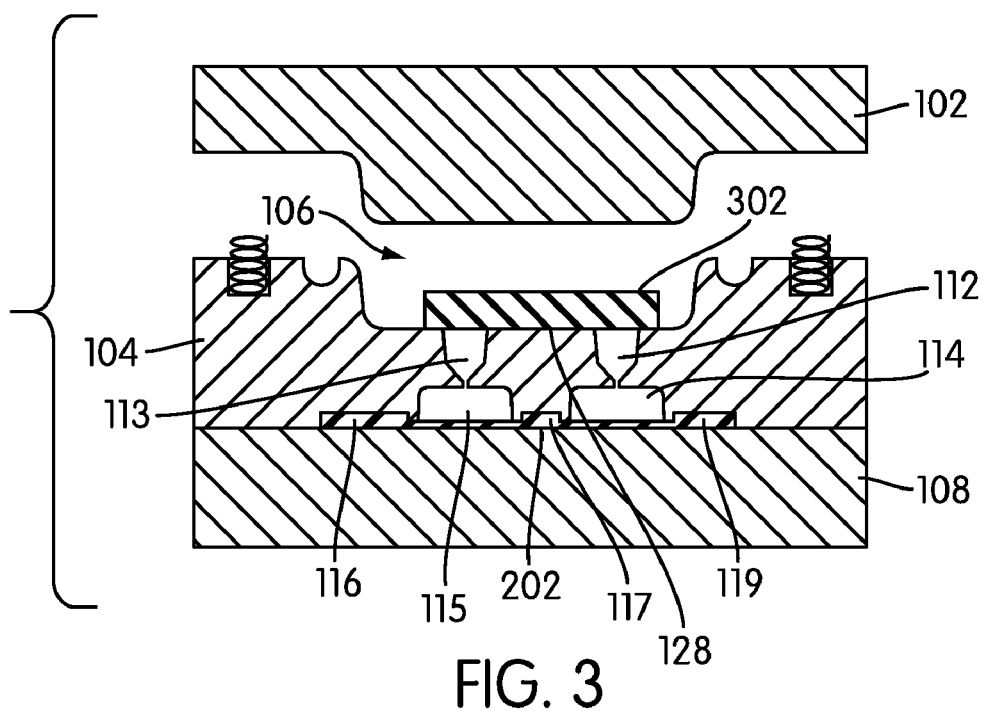
FIG. 3 is a schematic diagram of a preferred embodiment of a molding system with molding base compressed against central mold.

FIG. 3 shows a preferred embodiment of another step, where the movement of central mold 104 towards molding base 108 is accomplished. During this movement, portions of matrix lining 202 fill first lining recess 116, second lining recess 117, and third lining recess 119. In some embodiments, portions of central mold 104 will be in contact with molding base 108 after this movement step. Preferably, molding base 108 will be positioned with respect to central mold 104 in such a way that matrix lining 202 is exposed to first lug cavity 114 and second lug cavity 115.

At this point, a rubber forming block 302 is preferably placed in central cavity 106. Rubber forming block 302 may rest on central cavity floor 128. This rubber forming block 302 may be any type of solid material that can enter first injection cavity 112 and second injection cavity 113 under the designed heat and pressure exerted by manufacturing system 100.

Rubber forming block is generally composed of the kinds of rubber that are normally used to form the outsoles of shoes and other articles of footwear. In one embodiment, rubber forming block 302 is composed of Duralon©, which is a blown rubber having a specific gravity less than one. In other embodiments, other types of rubber may be used, including rubber compositions with a specific gravity greater than one. In some embodiments, rubber forming block 302 may be substituted with a block of any material that can flow and cure. That is, the block used to create tread elements need not be rubber. In general, materials with very high expansion rates and very high shrinkage rates are not suitable for this process. Therefore, any material with low expansion rates and low shrinkage rates, that can also flow and cure, are suitable. Throughout the specification, other rubber forming blocks that are disclosed may be composed of similar suitable materials.

Figure 4:
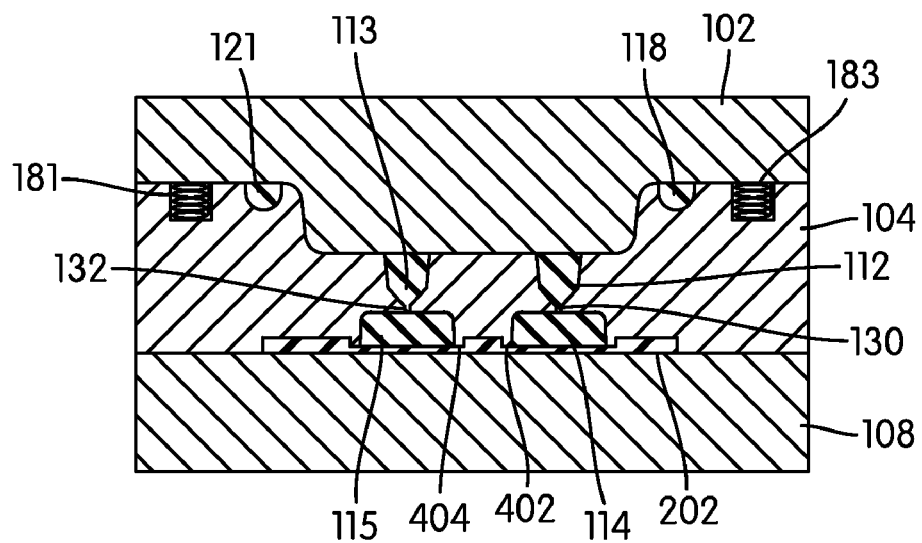
FIG. 4 shows a preferred embodiment of the compression of molding press with central mold.

FIG. 4 shows a preferred embodiment of the compression of molding press 102 with central mold 104. This compression, along with a heating process, liquefies rubber forming block 302. This liquid is then pressed through first injection cavity 112 and second injection cavity 113. Some of the liquid entering first injection cavity 112 eventually enters first lug cavity 114 via first lower orifice 130. Likewise, some of the liquid entering second injection cavity 113 eventually enters second lug cavity 115 via second lower orifice 132. Simultaneously, excess liquid can be gathered in first molding recess 118 and second molding recess 121. In embodiments that include first spring 181 and second spring 183, the springs will be depressed during this step of compression.

In a preferred embodiment of molding system 100, first lug cavity rim 402, which preferably extends around the entire outer periphery of first lug cavity 114, is preferably in contact with matrix lining 202 under enough pressure so that no liquefied rubber escapes the region enclosed by first lug cavity rim 402. In a similar manner, second lug cavity rim 404, which preferably extends around the entire outer periphery of second lug cavity 115, is preferably in contact with matrix lining 202 under enough pressure so that no liquefied rubber escapes the region enclosed by second lug cavity rim 404.

Preferably, manufacturing system 100 includes provisions that provide a pressure relief or pressure imbalance so that excess pressure does not cause manufacturing defects. Some embodiments include first molding recess 118 and second molding recess 121. These recesses can be used to collect excess molding material, for example liquefied rubber if rubber is used. First and second molding recesses 118 and 121 help to prevent excess rubber from seeping between any of the lug cavities and matrix lining 202.

In other embodiments, first molding recess 118 and second molding recess 121 are replaced with springs. In a preferred embodiment, manufacturing system 100 may include a first molding spring 181 and a second molding spring 183. First molding spring 181 may be disposed outward of first molding recess 118 or first molding spring 181 may replace first molding recess 118. Second molding spring 183 may be disposed outward of second molding recess 121 or second molding spring 183 may replace second molding recess 121. First molding spring 181 and second molding spring 183 are each preferably attached to central mold 104. These molding springs 181 and 183, preferably engage molding press 102 when molding press 102 is moved closer to central mold 104. These springs 181 and 183 preferably act to create a pressure imbalance that creates narrow gaps between molding press 102 and central mold 104. This allows excess liquid to escape through these narrow regions, as opposed to seeping between the lug cavities and matrix lining 202. Throughout this specification, molding recesses may be replaced by a molding spring, thus providing the pressure imbalance function described here.

Figure 5:
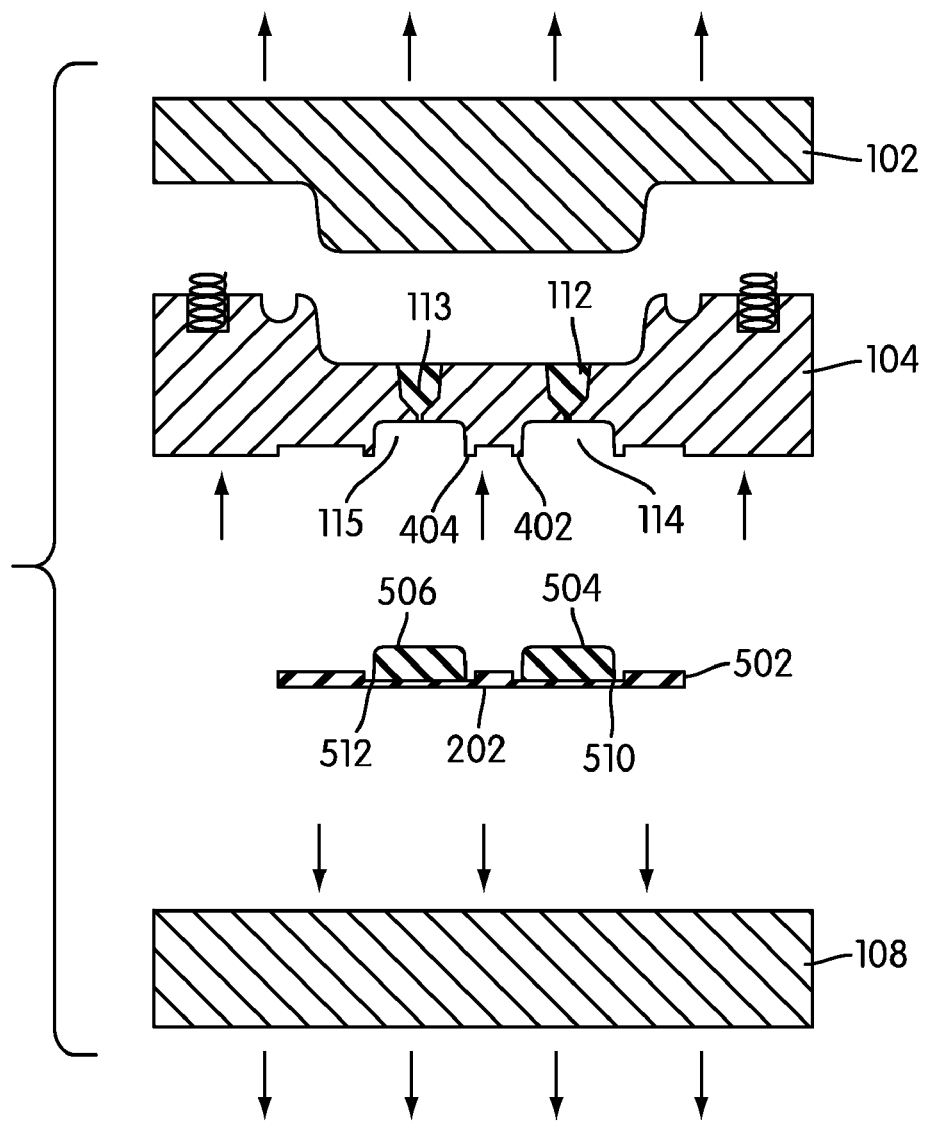
FIG. 5 shows a preferred embodiment of a tread assembly.

Once the rubber material has cooled, central mold 104 can be separated from molding base 108, yielding tread assembly 502, seen in FIG. 5. This separation can be performed by either lowering molding base 108 or raising central mold 104. What remains is tread assembly 502, which includes matrix lining 202 adjoined with first tread element 504 and second tread element 506. First tread element base 510 of first tread element 504 is no larger than the width of first lug cavity rim 402, and second tread element base 512 of second tread element 506 is no larger than the width of second lug cavity rim 404.

As some additional rubber material may be attached from rubber material that has solidified in first injection cavity 112 and second injection cavity 113, some means of removing this excess material may be provided. It is unlikely however that such excess material will interfere with the performance of tread assembly 502. In this particular embodiment, first tread element 504 and second tread element 506 are rectangular in shape but any shape can be made using first lug cavity 114 and second lug cavity 115. Such shapes may include tetrahedrons, cylinders, or rectangles. Irregular shapes may also be used. Since the composition of rubber forming block 302 may be modified, the composition of first tread element 504 and second tread element 506 can likewise be modified. This is a useful attribute since some tread assemblies may require the use of more durable rubber, while others may require the use of more flexible material.

The size of lug cavities is also unrestricted in this method. Although first lug cavity 114 and second lug cavity 115 are identical in size and shape, this need not be true in other embodiments. Some embodiments may have lug cavities in a variety of shapes and sizes and lug cavities that are different from one another.

Tread assembly 502, as seen in FIG. 5, includes only two tread elements. In other embodiments, tread assembly 502 may comprise a matrix lining with multiple tread elements. These tread elements could be simultaneously formed and joined to a matrix lining by modification of central mold 104 to include multiple injection cavities and lug cavities.

Figure 6:
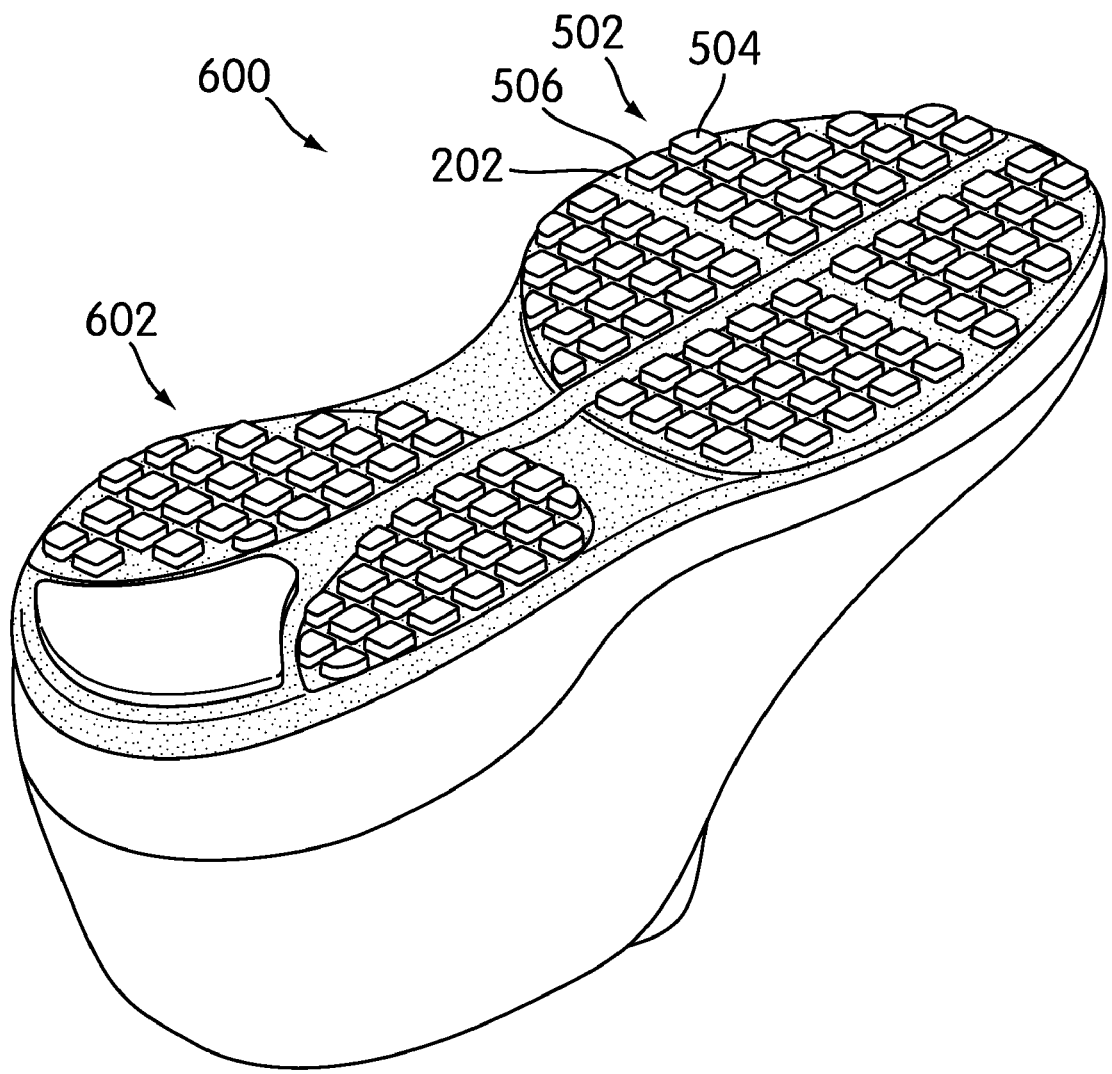
FIG. 6 shows a preferred embodiment of a shoe with tread assembly displayed as an outsole.

FIG. 6 shows a particular embodiment of an article of footwear 600. Here, tread assembly 502 has been attached to article of footwear 600 to form a portion of tread pattern 602 of article of footwear 600. Tread assembly 502 includes tread elements 504 and 506. Tread assembly 502 is joined to article of footwear 600 by matrix lining 202. Tread elements 504 and 506 are seen to be rectangular in this embodiment. Tread pattern 602 of article of footwear 600 can any design, including various shapes and sizes of tread elements.

In another embodiment, the tread assemblies can be varied in a number of ways. In some embodiments, different colored rubber forming blocks can be used simultaneously to create multi-colored tread elements. In other embodiments, several rubber blocks with different material composition can be used simultaneously. The resulting tread elements will likewise have varying colors and/or compositions within the same tread assembly.

This may be useful in designing outsoles where regions of tread that will be in contact with the ground most often must be made of a more durable rubber composition, while other regions that receive less wear can be designed with a more flexible rubber composition. Also, with aesthetics of particular importance in designing footwear, the ability to create a multi-colored tread in one step allows for more decorative patterns without a decrease in the production efficiency.

Figure 7:
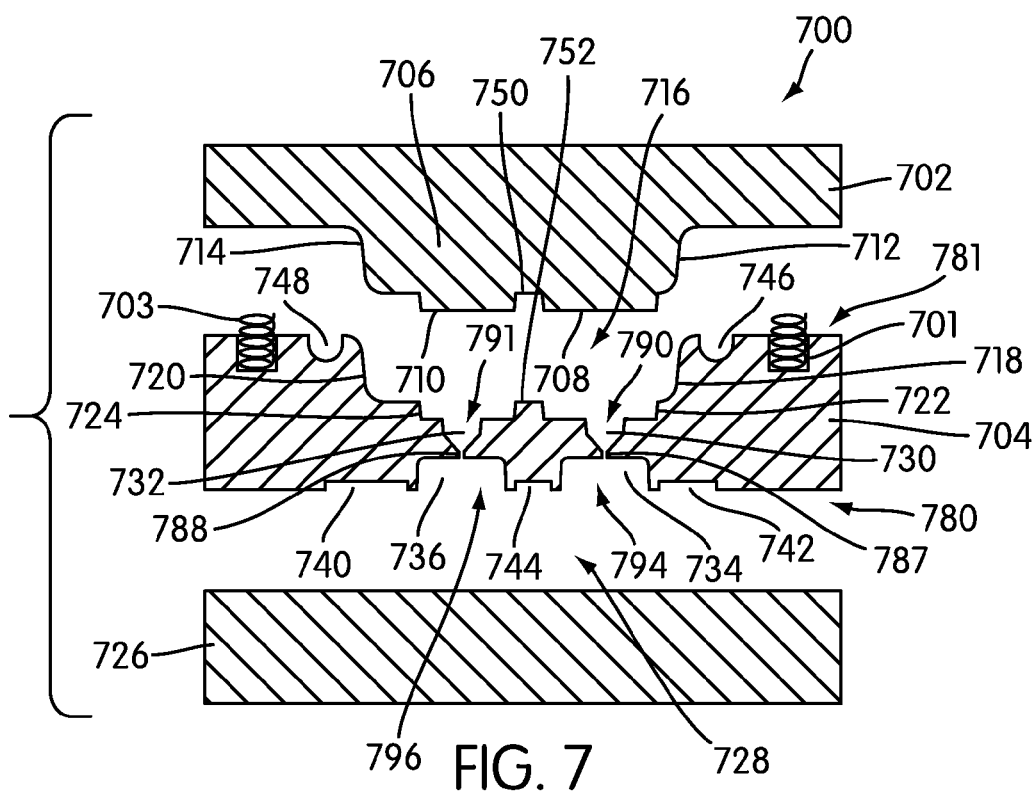
FIG. 7 is a schematic diagram of a preferred embodiment of a molding system.

FIG. 7 is a schematic diagram of a possible embodiment of a manufacturing system 700 used to create a tread assembly. Molding press 702 is disposed adjacent to central mold 704. Molding press 702 preferably includes press extension 706. Press extension 706 includes a first pressing surface 708 and a second pressing surface 710 that extend towards central mold 704. Press extension 706 can also include other pressing surfaces as well. Press extension 706 is formed by first extension wall 712 and second extension wall 714. Press extension 706 can also include other extension walls as well. Press extension 706 corresponds with a central cavity 716 disposed in central mold 704. In a preferred embodiment, central cavity 716 is disposed on second side 781 of central mold 704. Central cavity 716 includes first central cavity wall 718 and second central cavity wall 720 along with first central cavity indent 722 and second central cavity indent 724. Molding press 702 may move independently of central mold 704.

On a first side 780 of central mold 704, a molding base 726 is disposed near central mold 704, forming gap 728. The distance between molding base 726 and central mold 704 can be varied. In particular, both molding press 702 and molding base 726 can be moved closer to central mold 704, in some cases molding press 702 and molding base 726 can be moved to contact central mold 704. In some embodiments, the items comprising manufacturing system 700 can be made of a metallic material.

Central mold 704 includes first injection cavity 730 and second injection cavity 732. Also included in central mold 704 are first lug cavity 734 and second lug cavity 736. Preferably, first lug cavity 734 is in fluid communication with first injection cavity 730 through first lower orifice 787. This arrangement allows a liquid or viscous substance to pass between first injection cavity 730 and first lug cavity 734. Preferably, second lug cavity 736 is in fluid communication with second injection cavity 732 through second lower orifice 788. This arrangement can be similar to the arrangement of first injection cavity 730 and first lug cavity 734. And using that arrangement, a liquid or viscous substance can pass between second injection cavity 732 and second lug cavity 736 through second lower orifice 788.

In the embodiment shown in FIG. 7, only two injection and lug cavities are shown, however in some embodiments many more injection and lug cavities may be included. In particular, first injection cavity 730 and first lug cavity 734 may be associated with a set of injection and lug cavities that may extend in the direction perpendicular to molding system 700 as seen in FIG. 7.

Regarding the second side of 190 of central mold 704, first injection cavity 730 and second injection cavity 732 are in fluid communication with central cavity 716 through first upper orifice 790 and second upper orifice 791 respectively. Central mold 704 can also include first molding recess 746 and second molding recess 748. Central mold 704 may also include first spring 701 and second spring 703. On the first side 780 of central mold 704, first lug cavity 734 and the second lug cavity 736 are exposed to gap 728 through first lug cavity opening 794 and second lug cavity opening 796. In the embodiment shown in FIG. 7, first lug cavity 734 and second lug cavity 736 are rectangular, however these cavities can assume any shape including, but not limited to, typical shapes found on the outsoles of footwear. In addition, central mold 704 is equipped with first lining recess 740, second lining recess 742 and third lining recess 744. In some embodiments, central mold 704 contains a protrusion 752 that fits with indent 750, located in molding press 702.

Figure 8:
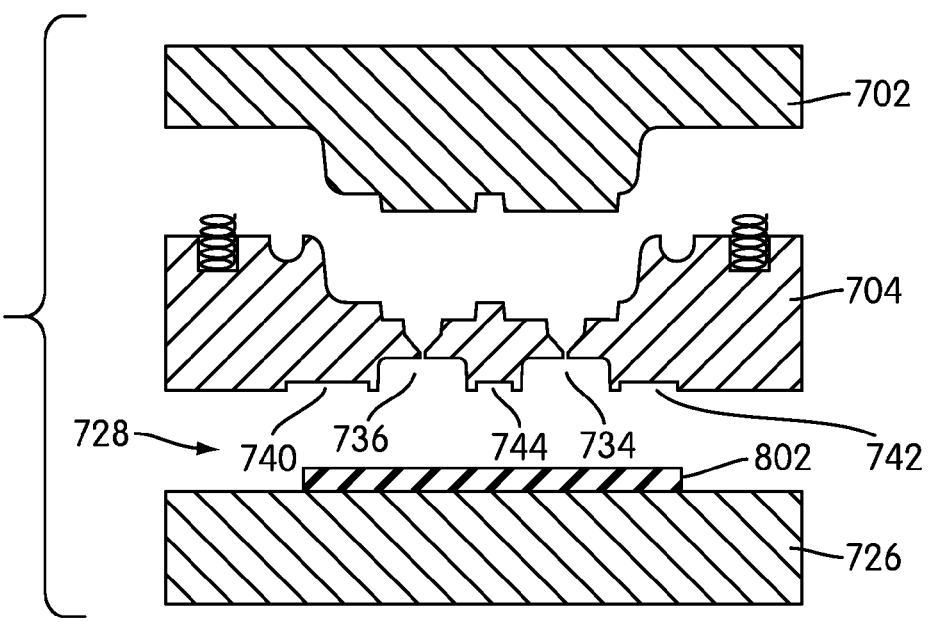
FIG. 8 is a schematic diagram of a preferred embodiment of a molding system with matrix lining attached.

Referring to FIG. 8, a preferred embodiment of a step for making a tread assembly is shown. First, a matrix lining 802 is placed on molding base 726. This can be achieved by sliding matrix lining 802 into place through gap 728, or by first moving molding base 726 away from central mold 704 and then returning molding base 726 after matrix lining 802 has been added. It may be preferable to fix matrix lining 802 in place to assure proper alignment with first lug cavity 734 and second lug cavity 736. In some embodiments, matrix lining 802 may be clamped down to molding base 726 or held in place with an adhesive. Matrix lining 802 may be a synthetic fiber, or any material that is lightweight and flexible. In a preferred embodiment, matrix lining 802 is placed on molding base 726 in a position where matrix lining 802 is aligned with first lining recess 740, second lining recess 742 and third lining recess 744.

Figure 9:
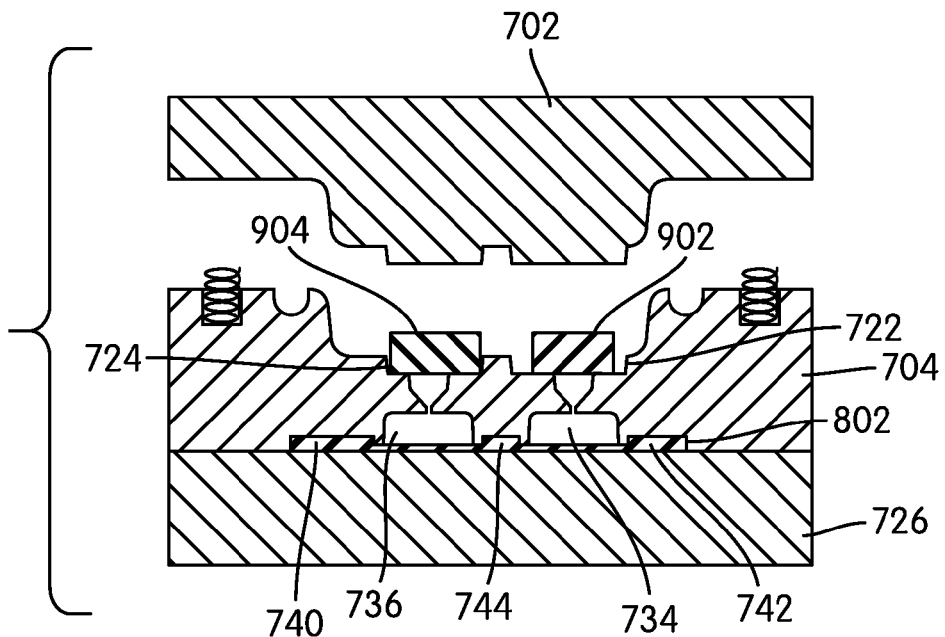
FIG. 9 is a schematic diagram of a preferred embodiment of a molding system with molding base compressed against central mold.

FIG. 9 shows a preferred embodiment of another step where, the movement of central mold 704 towards molding base 726 is accomplished. During this movement, portions of matrix lining 202 fill first lining recess 740, second lining recess 742, and third lining recess 744. In some embodiments, portions of central mold 704 will be in contact with molding base 726 after this movement step. Preferably molding base 726 will be positioned with respect to central mold 704 in such a way that matrix lining 802 is exposed to first lug cavity 734 and second lug cavity 736.

At this point, a first rubber forming block 902 is preferably placed in first central cavity indent 722 and a second rubber forming block 904 is preferably placed in second central cavity indent 724. First rubber forming block 902 and second rubber forming block 904 may rest on first central cavity indent 722 and second central cavity indent 724 respectively. First rubber forming block 902 and second rubber forming block 904 may be made of similar material and color. In some embodiments first rubber forming block 902 and second rubber forming block 904 may be made of different materials or colors.

Figure 10:
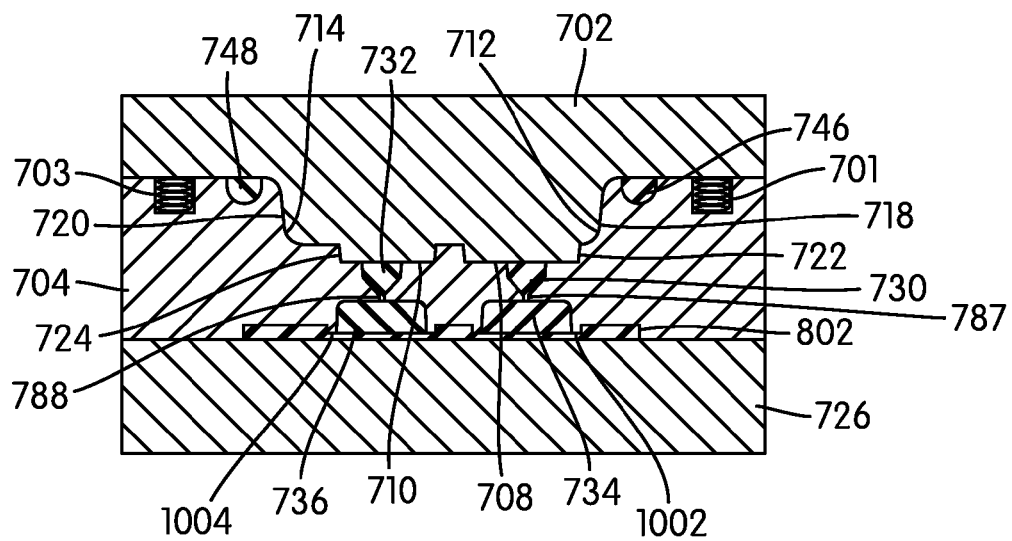
FIG. 10 shows a preferred embodiment of the compression of molding press with central mold.

FIG. 10 shows a preferred embodiment of the compression of molding press 702 with central mold 704. This compression, along with a heating process, liquefies first rubber forming block 902 and second rubber forming block 904. This liquid is then pressed through first injection cavity 730 and second injection cavity 732. Some of the liquid entering first injection cavity 730 eventually enters first lug cavity 734 via first lower orifice 787. Likewise, some of the liquid entering second injection cavity 732 eventually enters second lug cavity 736 via second lower orifice 788. Simultaneously, excess liquid may be gathered in first molding recess 746 and second molding recess 748. In embodiments that include first spring 701 and second spring 703, these springs may depress during this compression step. In some embodiments first pressing surface 708 fits within first central cavity indent 722. Also second pressing surface 710 fits within second central cavity indent 724. In some embodiments, first central cavity wall 718 is in contact with first extension wall 712. Also second central cavity wall 720 is in contact with second extension wall 714.

In a preferred embodiment of molding system 700, first lug cavity rim 1002, which preferably extends around the entire outer periphery of first lug cavity 734, is preferably in contact with matrix lining 802 under enough pressure so that no liquefied rubber escapes the region enclosed by first lug cavity rim 1002. In a similar manner, second lug cavity rim 1004, which preferably extends around the entire outer periphery of second lug cavity 736, is preferably in contact with matrix lining 802 under enough pressure so that no liquefied rubber escapes the region enclosed by second lug cavity rim 1004.

Figure 11:
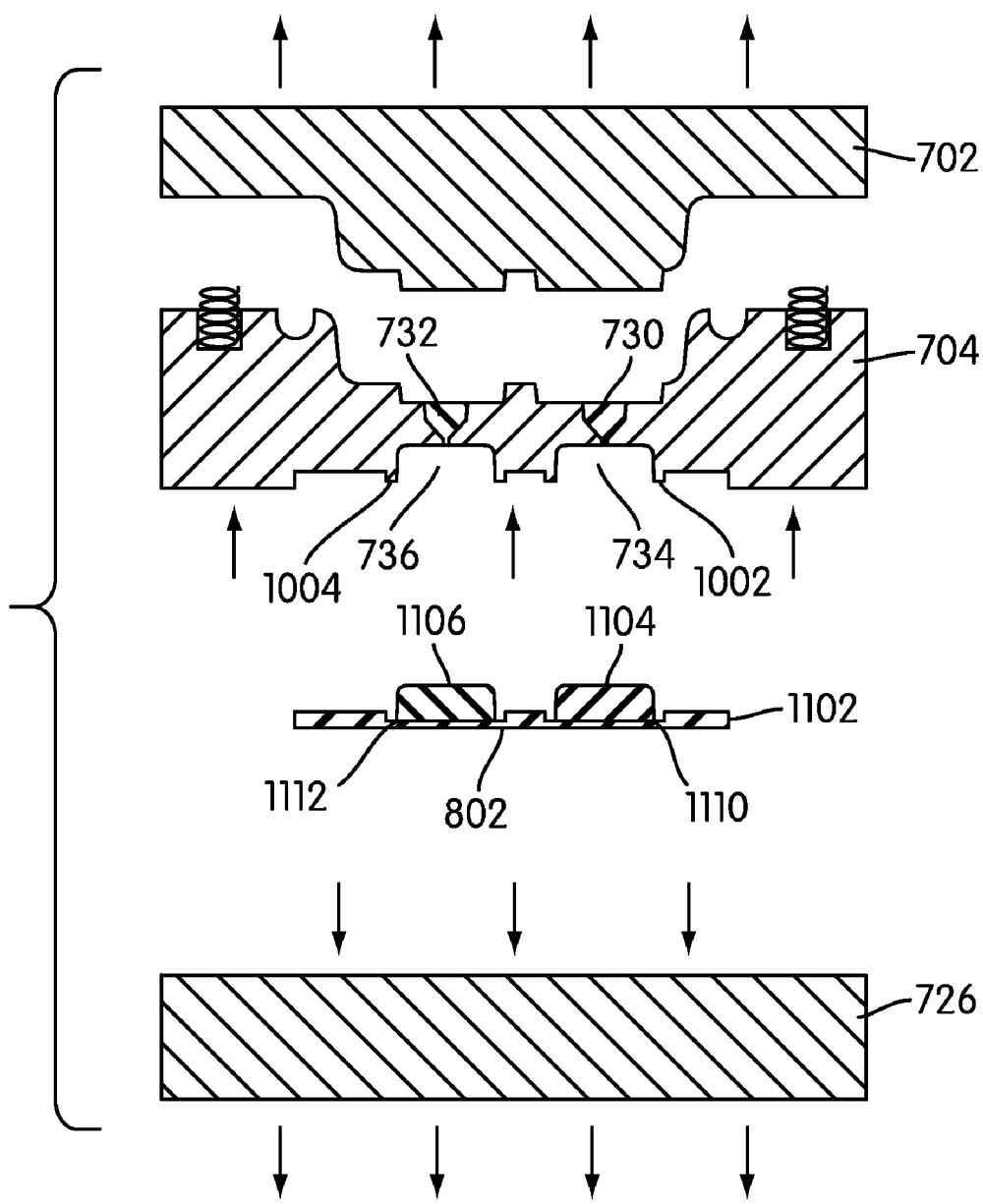
FIG. 11 shows a preferred embodiment of a tread assembly.

Once the rubber material has cooled, central mold 704 can be separated from molding base 726, yielding tread assembly 1102, seen in FIG. 11. This separation can be performed by either lowering molding base 726 or by raising central mold 704. What remains is tread assembly 502, which includes matrix lining 802 adjoined with first tread element 1104 and second tread element 1106. First tread element base 1110 of first tread element 1104 is no larger than the width of first lug cavity rim 1002 and second tread element base 1112 of second tread element 1106 is no larger than the width of second lug cavity rim 1004.

As some additional rubber material may be attached from rubber material that has solidified in first injection cavity 730 and second injection cavity 732, some means of removing this excess material may be provided. It is unlikely however that such excess material will interfere with the performance of tread assembly 1102. In this particular embodiment, first tread element 1104 and second tread element 1106 are rectangular in shape but any shape can be made using modified first lug cavity 734 and second lug cavity 736. Such shapes may include tetrahedrons, cylinders, or rectangles. Irregular shapes may also be used. Since the composition of first rubber forming block 902 and second rubber forming block 904 may be modified, the composition of first tread element 1104 and second tread element 1106 can likewise be modified. This is a useful attribute since some tread assemblies may require the use of more durable rubber, while others may require the use of more flexible material.

The size of lug cavities is also unrestricted in this method. Although first lug cavity 734 and second lug cavity 736 are identical in size and shape, this need not be true in other embodiments. Some embodiments may have lug cavities in a variety of shapes and sizes and lug cavities that are different from one another.

Tread assembly 1102, as seen in FIG. 11, includes only two tread elements. In other embodiments, tread assembly 1102 may comprise a matrix lining with multiple tread elements. These tread elements could be simultaneously formed by modification of central mold 704 to include multiple injection cavities and lug cavities.

Figure 12:
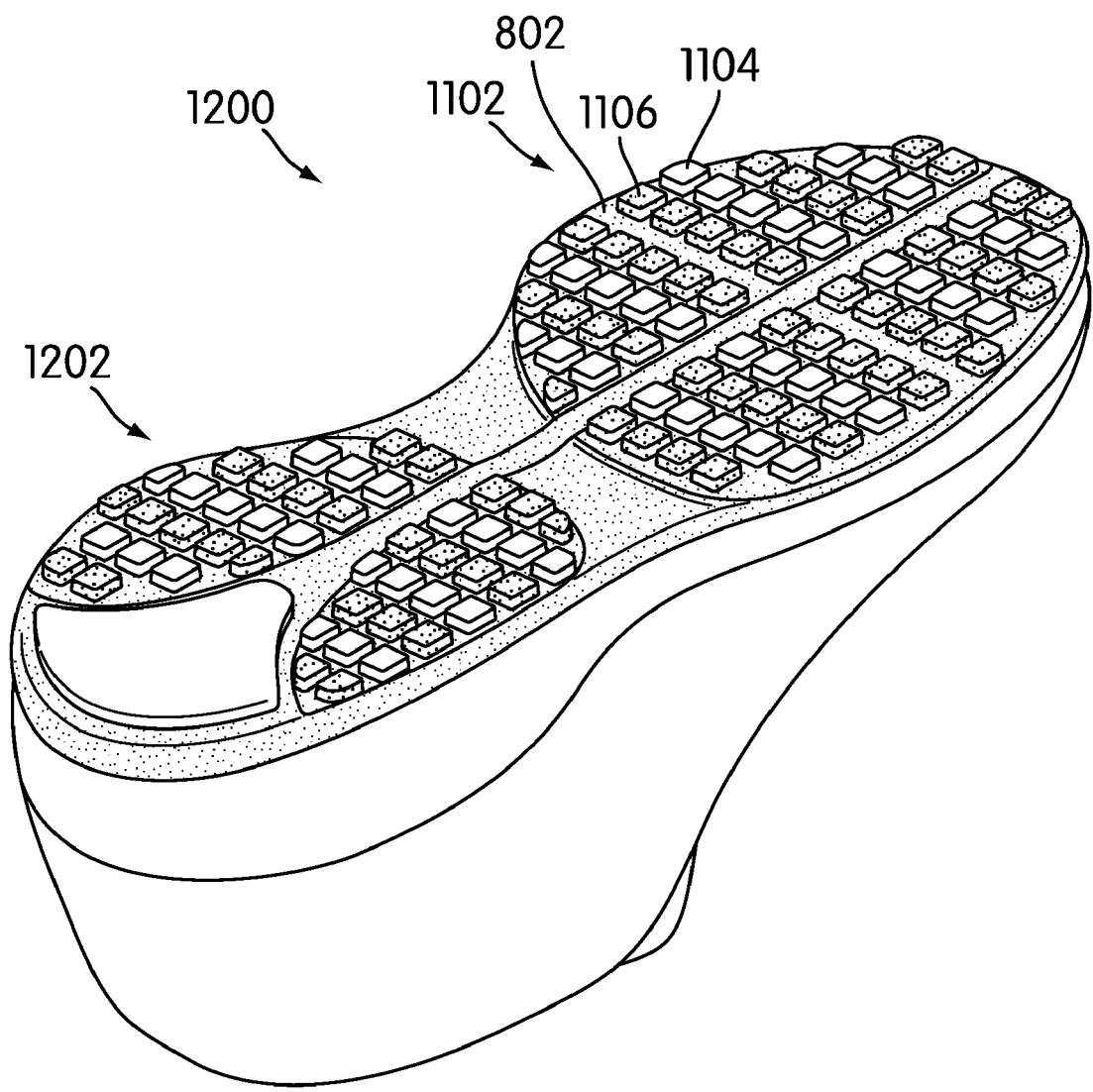
FIG. 12 shows a preferred embodiment of a shoe with tread assembly displayed as an outsole.

FIG. 12 shows a particular embodiment of an article of footwear 1200. Here, tread assembly 1102 has been attached to article of footwear 1200 to form tread pattern 1202 of footwear 1200. Tread assembly 1102 includes first tread element 1104 and second tread element 1106. In this embodiment, matrix lining 802 has been attached directly to the bottom of article of footwear 1200. First tread element 1104 may be different in appearance and/or composition from second tread element 1106. Tread pattern 1202 of article of footwear 1200 can be any design, including various shapes and sizes of tread elements. As previously discussed, each tread element in article of footwear 1200 may comprise any color or material.

In another embodiment the method allows for variation of the tread assemblies. This particular embodiment allows for a way to adhere multiple layers of tread elements to the matrix lining. This is done by creating a first layer of tread elements that adhere to the matrix lining as described above. Following this, the tread assembly is placed under another central mold and the previous steps are repeated to build up new tread elements atop the old ones. This "stacking" of tread elements allows for more intricate tread design. This sort of stacking may be useful if a tread assembly is to be designed so that the closest portion of a tread element to the matrix lining is to be more durable than the portion of the tread element most often in contact with the ground. It also allows for tread elements to be composed themselves of multicolored layers.

Figure 13:
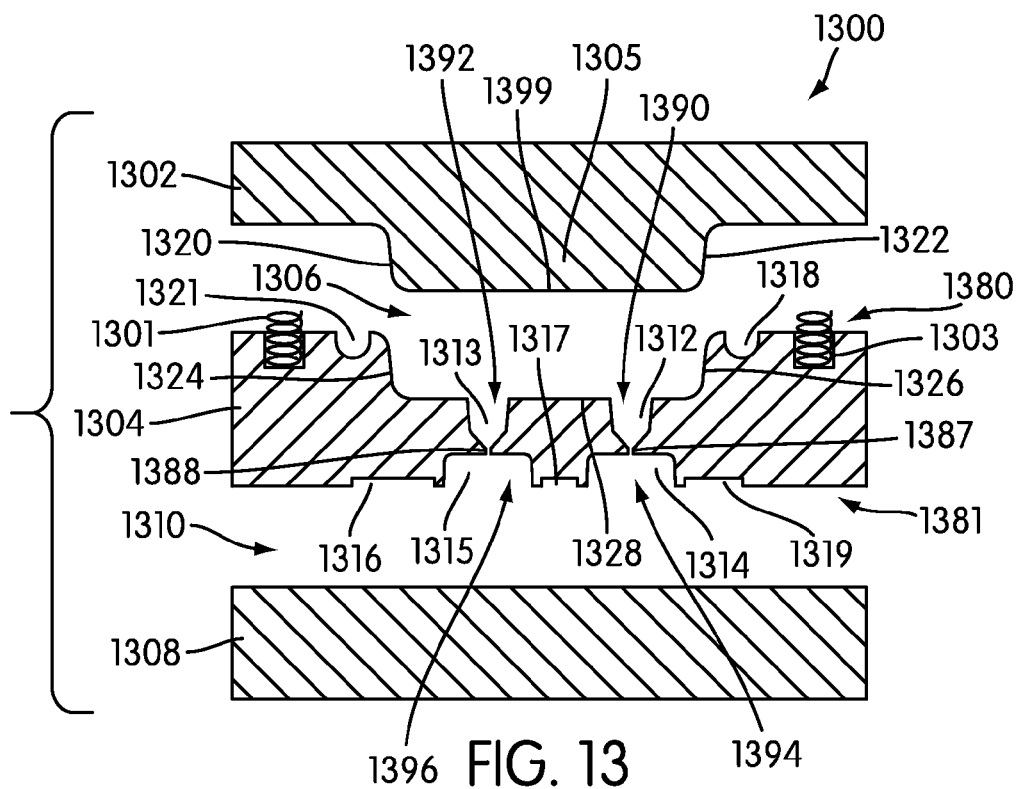
FIG. 13 is a schematic diagram of a preferred embodiment of a molding system

FIG. 13 is a schematic diagram of another possible embodiment of a manufacturing system 1300 used to create a tread assembly. Molding press 1302 is disposed adjacent to central mold 1304. Molding press 1302 includes press extension 1303. Press extension 1303 includes a pressing surface 1399 that extends towards central mold 1304. Press extension 1303 is formed by first extension wall 1320 and second extension wall 1322. Press extension 1303 corresponds with central cavity 1306 disposed in central mold 1304. In a preferred embodiment, central cavity 1306 is disposed on second side 1380 of central mold 1304. Central cavity 1306 includes first central cavity wall 1324 and second central cavity wall 1326 along with central cavity floor 1328. Molding press 1302 may move independently of central mold 1304.

On a first side 1381 of central mold 1304, a molding base 1308 is disposed near central mold 1304, forming gap 1310. The distance between molding base 1308 and central mold 1304 can be varied. In particular, both molding press 1302 and molding base 1308 can be moved closer to central mold 1304, in some cases molding press 1302 and molding base 1308 can be moved to contact central mold 1304. In some embodiments, the items comprising manufacturing system 1300 can be made of a metallic material.

Central mold 1304 includes first injection cavity 1312 and second injection cavity 1313. Also included in central mold 1304 are first lug cavity 1314 and second lug cavity 1315. Preferably, first lug cavity 1314 is in fluid communication with first injection cavity 1312 by way of first lower orifice 1387. This arrangement allows a liquid or viscous substance to pass between first injection cavity 1312 and first lug cavity 1314. Preferably, second lug cavity 1315 is in fluid communication with second injection cavity 1313 by way of second lower orifice 1388. This arrangement can be similar to the arrangement of first injection cavity 1312 and first lug cavity 1314. And using that arrangement, a liquid or viscous substance can pass between second injection cavity 1313 and second lug cavity 1315.

In the embodiment shown in FIG. 13 only two injection and lug cavities are shown, however in some embodiments many more injection and lug cavities may be included. In particular, first injection cavity 1312 and first lug cavity 1314 may be associated with a set of injection and lug cavities that may extend in the direction perpendicular to molding system 1300 as seen in FIG. 13.

Regarding the second side 1380 of central mold 1304, first injection cavity 1312 and second injection cavity 1313 are in fluid communication with central cavity 1306 by way of first upper orifice 1390 and second upper orifice 1392. Central mold 1304 can also include first molding recess 1318 and second molding recess 1321. Central mold may also include first spring 1301 and second spring 1303. On the first side 1381 of central mold 1304, first lug cavity 1314 and the second lug cavity 1315 are exposed to gap 1310 by way of first lug cavity opening 1394 and second lug cavity opening 1396. In the embodiment shown in FIG. 13, first lug cavities 1314 and second lug cavity 1315 are rectangular, however these cavities can assume any shape including, but not limited to, typical shapes found on the outsoles of footwear. In addition, central mold 1304 is equipped with first lining recess 1316, second lining recess 1317 and third lining recess 1319.

Figure 14:
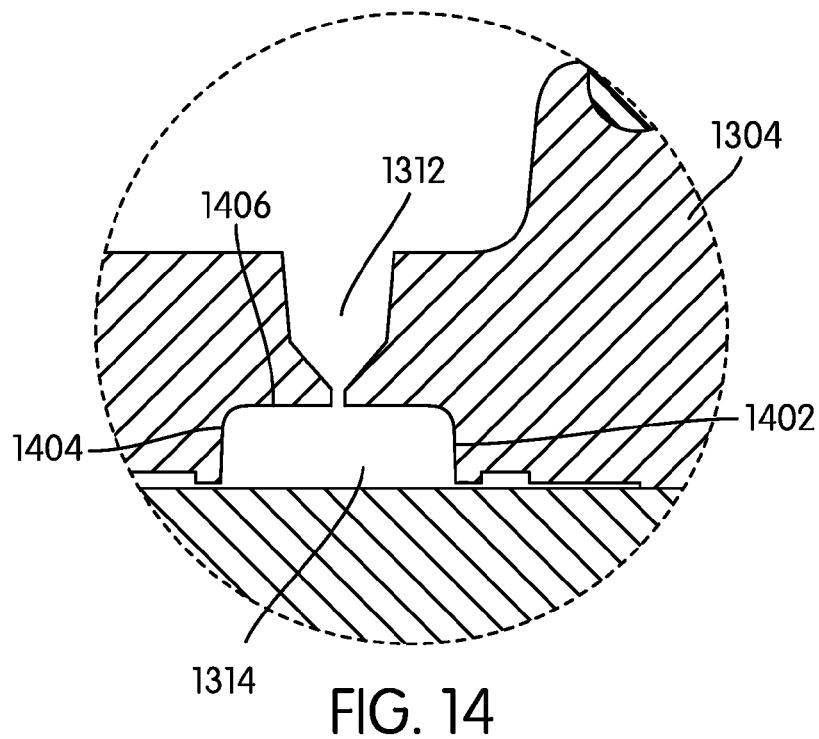
FIG. 14 is a schematic diagram of a preferred embodiment of a portion of a central mold.

FIG. 14 shows an enlarged view of a preferred embodiment of central mold 1304 including first injection cavity 1312 that is in fluid communication with first lug cavity 1314. Included in first lug cavity 1314 are first lug cavity wall 1402 and second lug cavity wall 1404. Also shown in FIG. 14 is first lug cavity ceiling 1406. For different embodiments the height of first lug cavity wall 1402 and second lug cavity wall 1404 may be changed to vary the height of desired tread elements for the tread assembly. The width of first lug cavity ceiling 1406 can also be varied.

Figure 15:
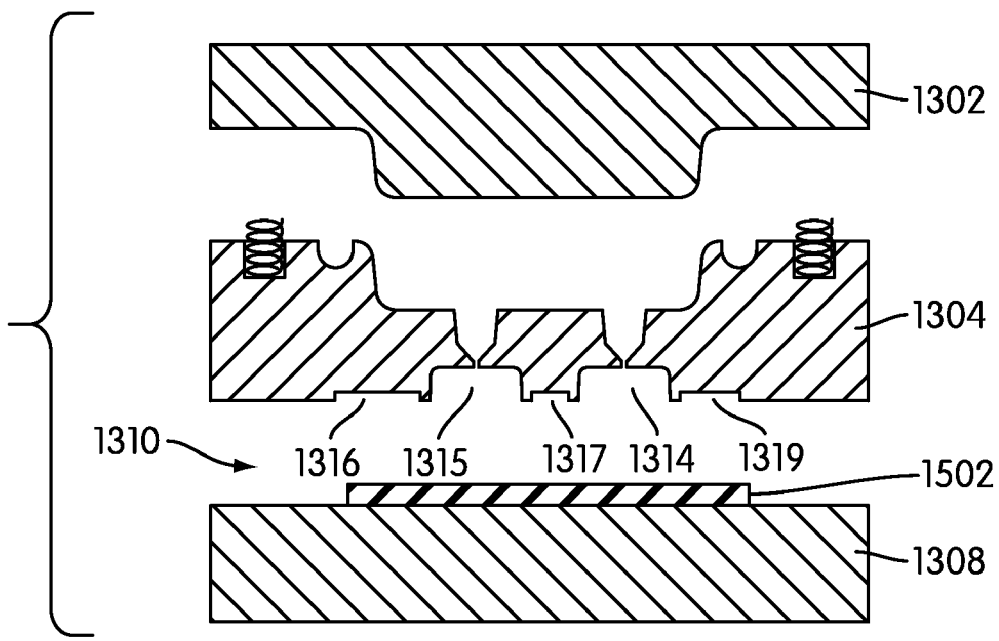
FIG. 15 is a schematic diagram of a preferred embodiment of a molding system with matrix lining attached.

Referring to FIG. 15, a preferred embodiment of a step for making a tread assembly with multiple layers of tread elements is shown. First, a matrix lining 1502 is placed on molding base 1308. This can be achieved by sliding matrix lining 1502 into place through gap 1310, or by first moving molding base 1308 away from central mold 1304 and then returning molding base 1308 after matrix lining 1502 has been added. It may be preferable to fix matrix lining 1502 in place to assure proper alignment with first lug cavity 1314 and second lug cavity 1315. In some embodiments, matrix lining 1502 may be clamped down to molding base 1308 or held in place with an adhesive. Matrix lining 1502 may be a synthetic fiber, or any material that is lightweight and flexible. In a preferred embodiment, matrix lining 1502 is placed on molding base 1308 in a position where matrix lining 1502 is aligned with first lining recess 1316, second lining recess 1317 and third lining recess 1319.

Figure 16:
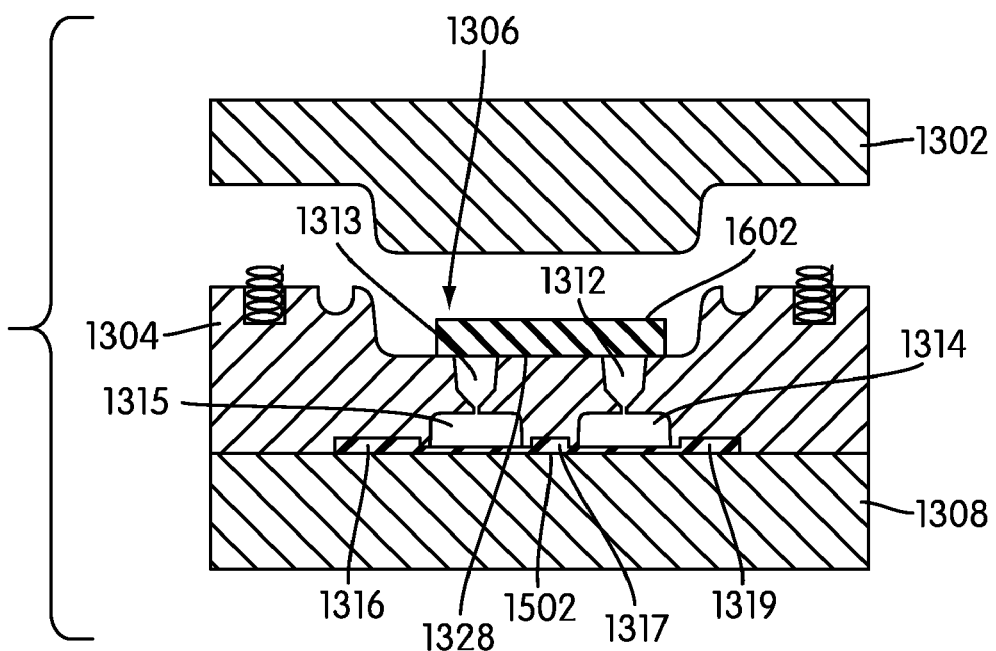
FIG. 16 is a schematic diagram of a preferred embodiment of a molding system with molding base compressed against central mold.

FIG. 16 shows a preferred embodiment of another step, where the movement of central mold 1304 towards molding base 1308 is accomplished. During this movement, portions of matrix lining 1502 fill first lining recess 1316, second lining recess 1317, and third lining recess 1319. In some embodiments, portions of central mold 1304 will be in contact with molding base 1308 after this compression step. Preferably, molding base 1308 will be positioned with respect to central mold 1304 in such a way that matrix lining 1502 is exposed to first lug cavity 1314 and second lug cavity 1315.

At this point, a rubber forming block 1602 is preferably placed in central cavity 1306. Rubber forming block 1602 may rest on central cavity floor 1328. This rubber forming block 1602 may be any type of solid material that can enter first injection cavity 1312 and second injection cavity 1313 under the designed heat and pressure exerted by manufacturing system 1300.

Figure 17:
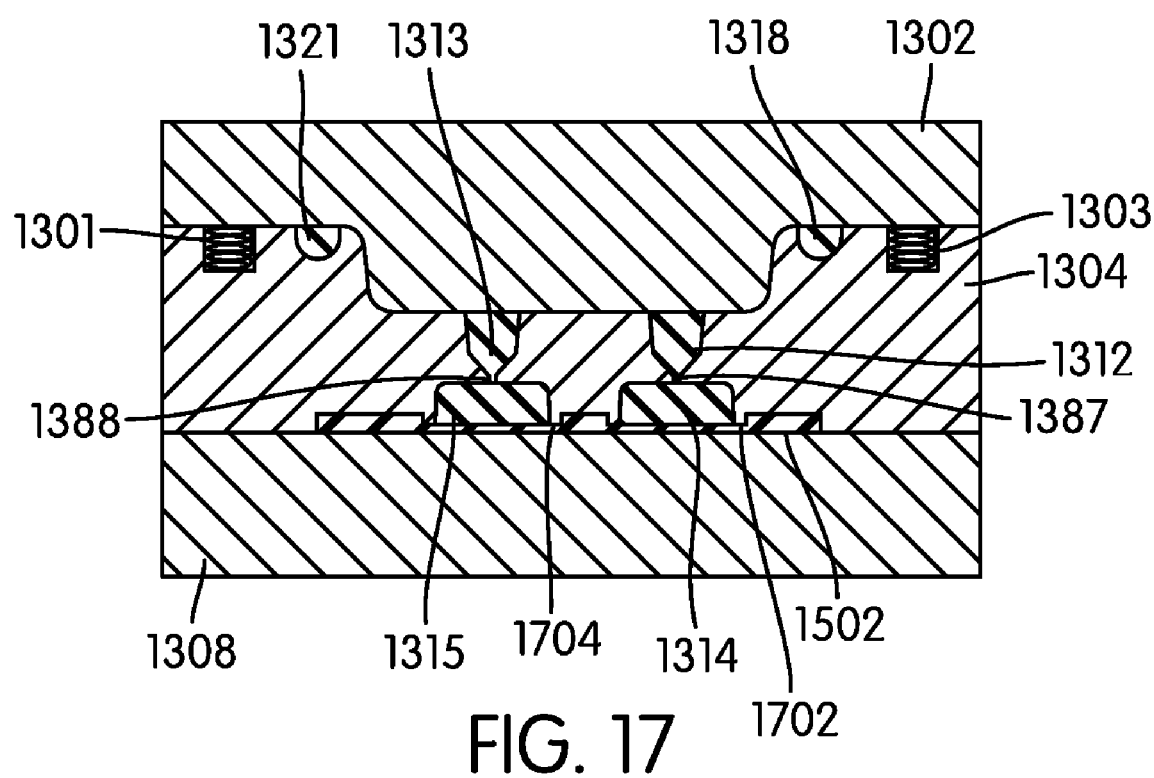
FIG. 17 shows a preferred embodiment of the compression of molding press with central mold.

FIG. 17 shows a preferred embodiment of the compression of molding press 1302 with central mold 1304. This compression, along with a heating process, liquefies rubber forming block 1602. This liquid is then pressed through first injection cavity 1312 and second injection cavity 1313. Some of the liquid entering first injection cavity 1312 eventually enters first lug cavity 1314 via first lower orifice 1387. Likewise, some of the liquid entering second injection cavity 1313 eventually enters second lug cavity 1315 via second lower orifice 1388. Simultaneously, excess liquid can be gathered in first molding recess 1318 and second molding recess 1321. In embodiments that include first spring 1301 and second spring 1303, these springs may depress during this compression step.

In a preferred embodiment of molding system 1300, first lug cavity rim 1702, which preferably extends around the entire outer periphery of first lug cavity 1314, is preferably in contact with matrix lining 1502 under enough pressure so that no liquefied rubber escapes the region enclosed by first lug cavity rim 1702. In a similar manner, second lug cavity rim 1704, which preferably extends around the entire outer periphery of second lug cavity 1315, is preferably in contact with matrix lining 1502 under enough pressure so that no liquefied rubber escapes the region enclosed by second lug cavity rim 1704.

Figure 18:
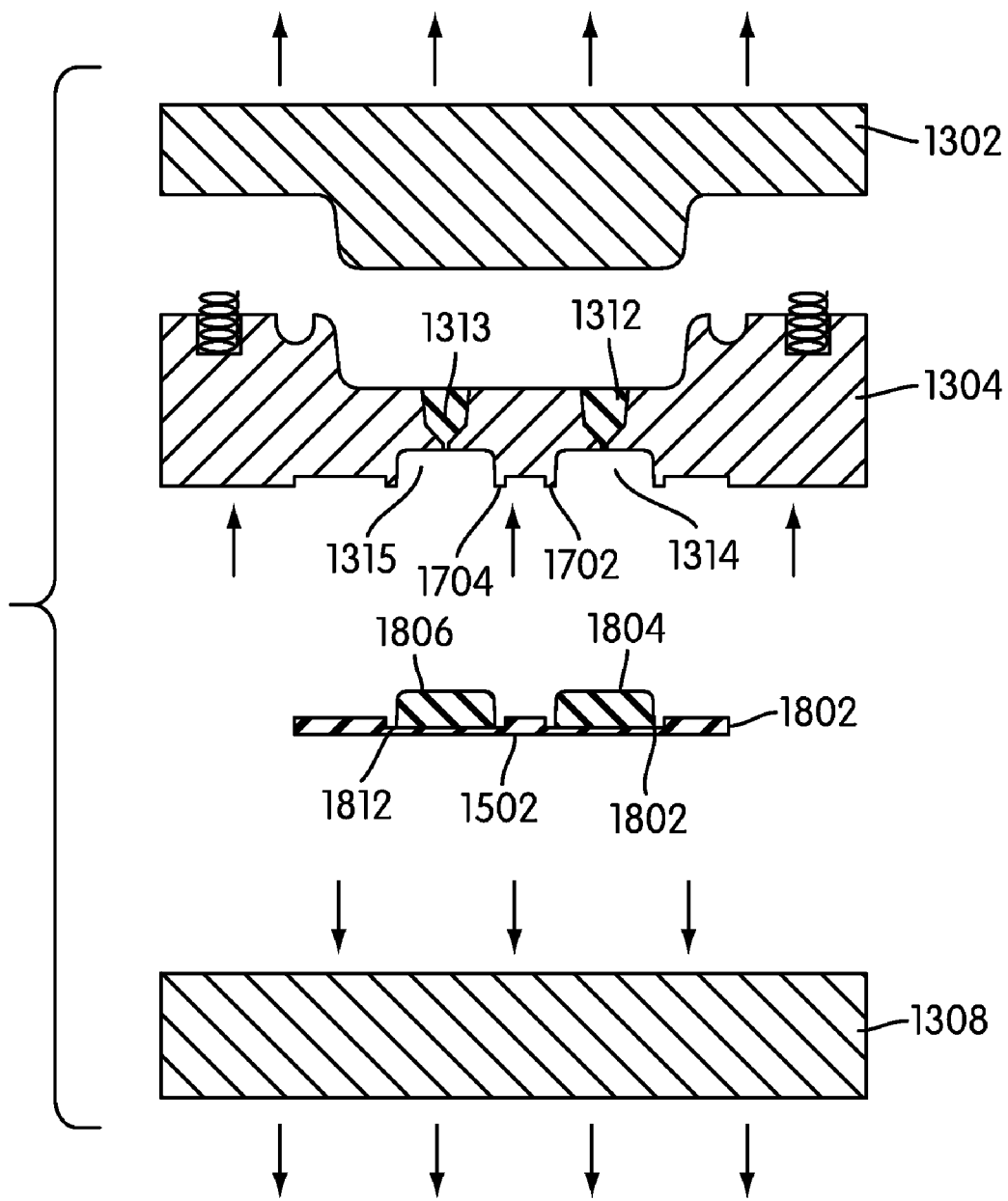
FIG. 18 shows a preferred embodiment of a part of a tread assembly.

Once the rubber material has cooled, central mold 1304 can be separated from molding base 1308, yielding tread assembly 1802, seen in FIG. 18. This separation can be performed by either lowering molding base 1308 or raising central mold 1304. What remains is tread assembly 1802, which includes matrix lining 1502 adjoined with first tread element 1804 and second tread element 1806. First tread element base 1810 of first tread element 1804 is no larger than the width of first lug cavity rim 170, and second tread element base 1812 of second tread element 1806 is no larger than the width of second lug cavity rim 1704.

As some additional rubber material may be attached from rubber material that has solidified in first injection cavity 1312 and second injection cavity 1313, some means of removing this excess material may be provided. It is unlikely however that such excess material will interfere with the performance of tread assembly 1802. In this particular embodiment, first tread element 1804 and second tread element 1806 are rectangular in shape but any shape can be made using modified first lug cavity 1314 and 1315. Such shapes may include tetrahedrons, cylinders, or rectangles. Irregular shapes may also be used. Since the composition of rubber forming block 1602 may be modified, the composition of first tread element 1804 and second tread element 1806 can likewise be modified. This is a useful attribute since some tread assemblies may require the use of more durable rubber, while others may require the use of more flexible material.

The size of lug cavities is also unrestricted in this method. Although first lug cavity 1314 and second lug cavity 1315 are identical in size and shape, this need not be true in other embodiments. Some embodiments may have lug cavities in a variety of shapes and sizes and lug cavities that are different from on another.

Figure 19:
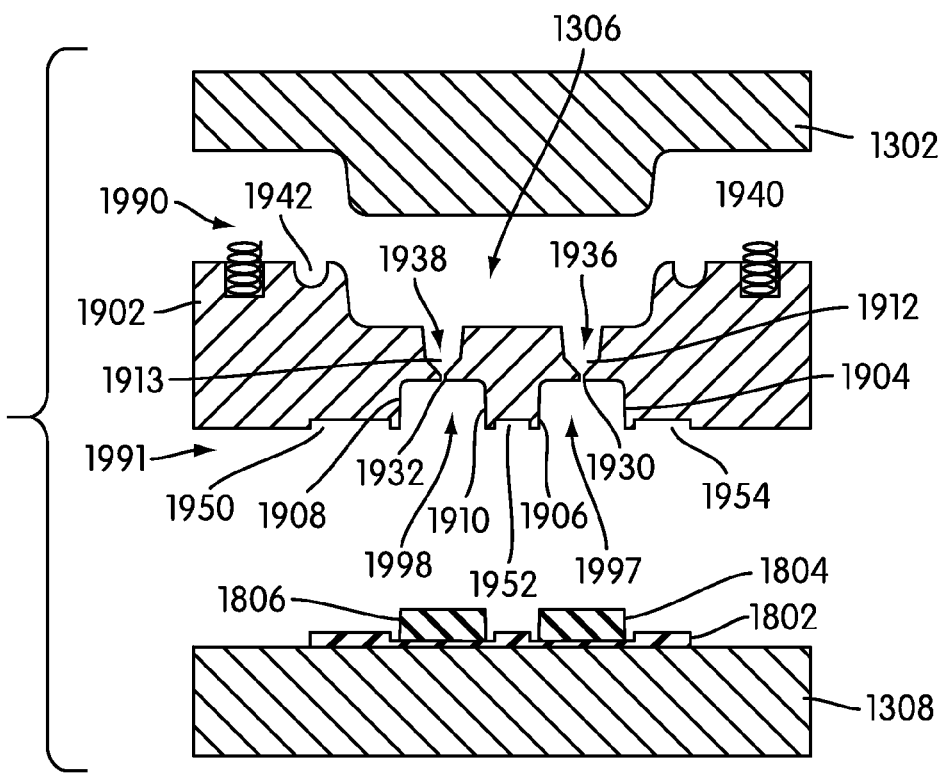
FIG. 19 shows a schematic diagram of a preferred embodiment of a molding system with central mold having been modified.

FIG. 19 is illustrative of a preferred embodiment of another step in the creation of a tread assembly. In this step, central mold 1304 is replaced with modified central mold 1902. This modified central mold may be similar to central mold 1304 in most respects. Preferably, modified central mold 1902 includes first injection cavity 1912 and second injection cavity 1913. Also included in modified central mold 1902 are first modified lug cavity 1914 and second modified lug cavity 1915. Preferably, first modified lug cavity 1914 is in fluid communication with first injection cavity 1912 via first lower orifice 1930. This arrangement allows a liquid or viscous substance to pass between first injection cavity 1912 and first modified lug cavity 1914. Preferably, second modified lug cavity 1915 is in fluid communication with second injection cavity 1913 via second lower orifice 1932. This arrangement can be similar to the arrangement of first injection cavity 1912 and first modified lug cavity 1914. And using that arrangement, a liquid or viscous substance can pass between second injection cavity 1913 and second modified lug cavity 1915 through second lower orifice 1932.

Preferably, first modified lug cavity 1914 and second modified lug cavity 1915 are larger than the lug cavities of central mold 1304. In particular, first lug cavity wall 1904, second lug cavity wall 1906, third lug cavity wall 1910, and fourth lug cavity wall 1908 are all taller than the lug cavity walls of central mold 1304. In this way, first modified lug cavity 1914 and second modified lug cavity 1915 are taller than first lug cavity 1314 and second lug cavity 1315.

In the embodiment shown in FIG. 19 only two injection cavities are shown, however in some embodiments many more injection and lug cavities may be included. In particular, first injection cavity 1912 and first modified lug cavity 1914 may be associated with a set of injection and lug cavities that may extend in the direction perpendicular to modified central mold 1902 as seen in FIG. 19.

Regarding the second side 1990 of modified central mold 1902, first injection cavity 1912 and second injection cavity 1913 are in fluid communication with central cavity 1306 via first upper orifice 1936 and second upper orifice 1938 respectively. Modified central mold 1902 can also include first molding recess 1940 and second molding recess 1942. On the first side 1991 of modified central mold 1902, first lug cavity 1914 and the second lug cavity 1915 are exposed to gap 1310 via first lug opening 1997 and second lug opening 1998. In the embodiment shown in FIG. 19, first modified lug cavity 1914 and second modified lug cavity 1915 are rectangular, however these cavities can assume any shape including, but not limited to, typical shapes found on the outsoles of articles of footwear. In addition, modified central mold 1902 is equipped with first lining recess 1950, second lining recess 1952 and third lining recess 1954.

With modified central mold 1902 in place, tread assembly 1802 is placed on molding base 1308. This can be achieved by sliding tread assembly 1802 into place through gap 1310, or by first moving molding base 1308 away from central modified central mold 1902 and then returning molding base 1308 after tread assembly 1802 has been added. It may be preferable to fix tread assembly 1502 in place to assure proper alignment with first modified lug cavity 1914 and second modified lug cavity 1915. In some embodiments, tread assembly 1802 may be clamped down to molding base 1308 or held down with an adhesive. In a preferred embodiment, tread assembly 1802 is placed on molding base 1308 in a position where tread assembly 1802 is aligned with first lining recess 1950, second lining recess 1952, and third lining recess 1954.

Figure 20:
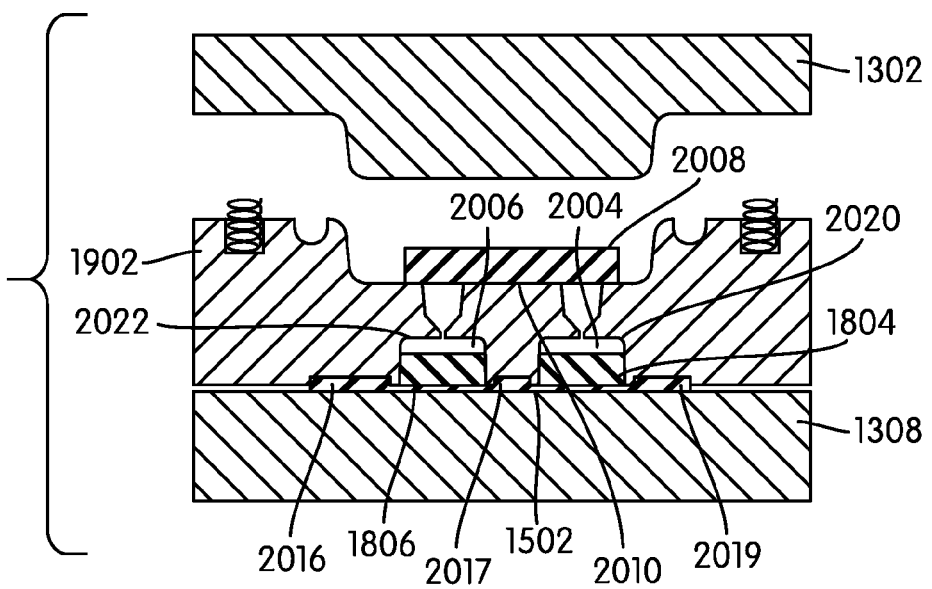
FIG. 20 is a schematic diagram of a preferred embodiment of a molding system with molding base compressed against central mold.

FIG. 20 shows a preferred embodiment of another step, where the movement of modified central mold 1902 towards molding base 1308 is accomplished. During this step, portions of matrix lining 1502 fill first lining recess 2016, second lining recess 2017, and third lining recess 2019. Additionally, first tread element 1804 and second tread element 1806 fit just within first modified lug cavity 1914 and second modified lug cavity 1915 respectively. However some room is left between first tread element 1804 and first lug ceiling 2020. Room is also left between second tread element 1806 and second lug ceiling 2022.

These spaces make up first excess cavity 2004 and second excess cavity 2006. First excess cavity 2004 and second excess cavity 2006 are the portions of first modified lug cavity 1914 and second modified lug cavity 1915, respectively, in which new tread forming material will be added to form a second layer to first tread element 1804 and second tread element 1806. Preferably, first tread element 1804 fits within first modified lug cavity in such a way that no tread forming material leaves first excess cavity 2004 during the molding process. Likewise, it is preferable that second tread forming element 1806 fits within second modified lug cavity 1915 in such a way that no tread forming material leaves the second excess cavity 2006 during the molding process.

Once molding base 1308 and modified central mold 1902 are in contact, second rubber forming block 2008 is added to molding system 1300. Second rubber forming block 2008 may be placed on modified central cavity floor 2010.

Figure 21:
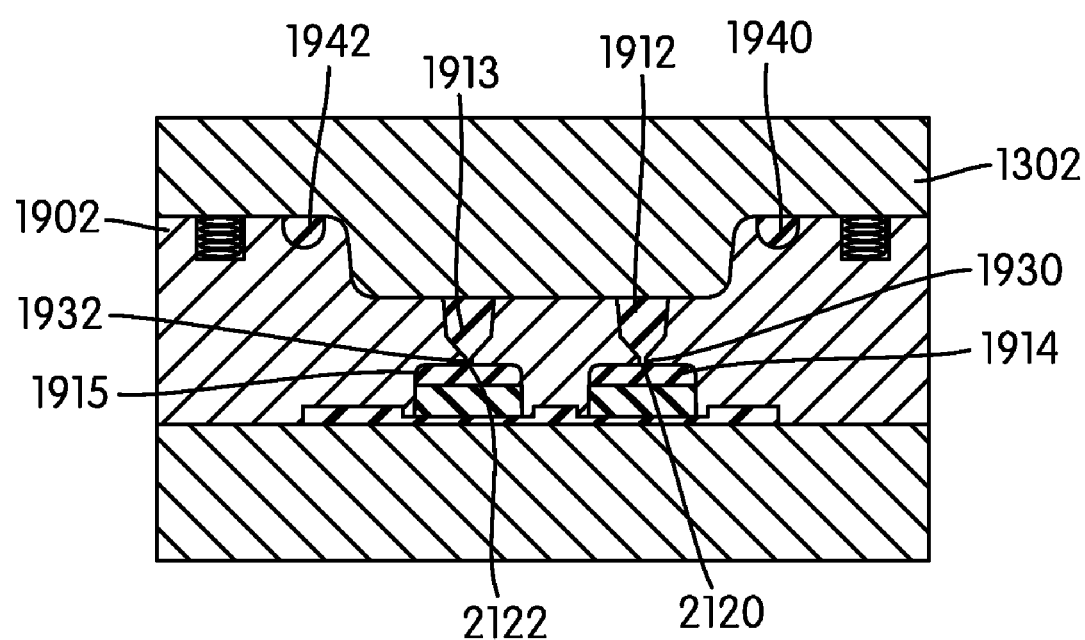
FIG. 21 shows a preferred embodiment of the compression of molding press with central mold.

FIG. 21 shows a preferred embodiment of the compression of modified central mold 1902 with molding press 1302. This compression, along with a heating process, liquefies second rubber forming block 2008. This liquid is then pressed through modified first injection cavity 2102 and modified second injection cavity 2104. Some of the liquid entering first injection cavity 1912 eventually enters first modified lug cavity 1914 via first lower orifice 1930. Likewise, some of the liquid entering second injection cavity 1913 eventually enters second modified lug cavity 1915 via second lower orifice 1932. Simultaneously excess liquid is gathered in modified first molding recess 2110 and modified second molding recess 2112.

Figure 22:
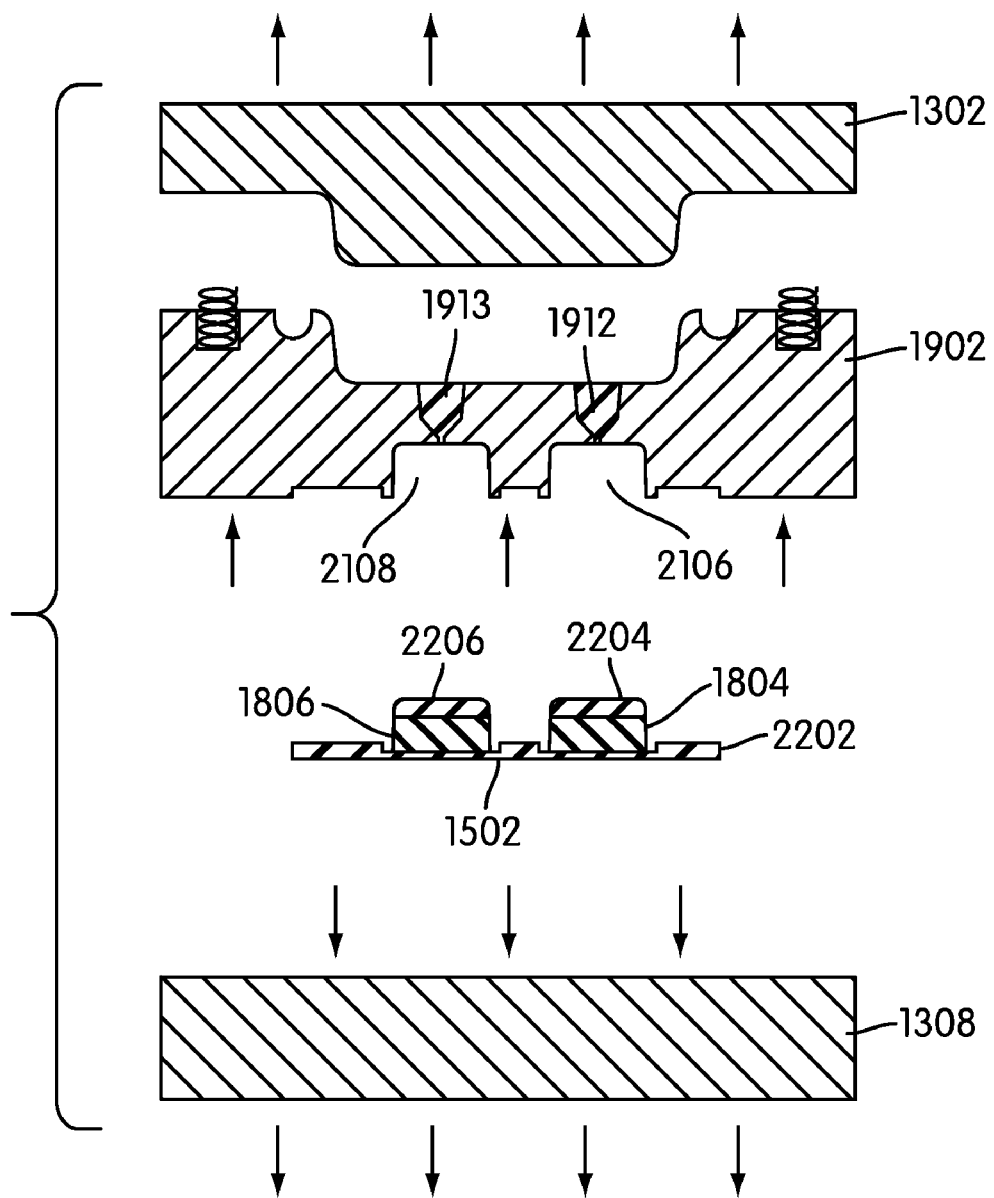
FIG. 22 shows a preferred embodiment of a part of a tread assembly.

Once the rubber material has cooled, modified central mold 1902 can be separated from molding base 1308, yielding modified tread assembly 2202, seen in FIG. 22. This separation can be performed by either lowering molding base 1308 or raising modified central mold 1902. What remains is tread assembly 1802, which includes matrix lining 1502 joined with first tread element 1804 combined with first tread element cap 2204. Also second tread element 1806 has been combined with second tread element cap 2206.

It should be kept in mind that FIG. 21 is schematic diagram. Generally, when liquid from second rubber forming block 2008 enters first modified lug cavity 1914 and second modified lug cavity 1915, the entering liquid mixes with first tread element 1804 and second tread element 1806. This is because first tread element 1804 and second tread element 1806 have generally not cured when the liquid enters. The very precise layering structure shown in FIG. 21 may not occur, and the entering liquid usually mixes with the rubber of first tread element 1804 and second tread element 1806 resulting in a mixed appearance. It is possible to provide a stacked structure, as shown in FIG. 21, if the rubber or material used to form first tread element 1804 and second tread element 1806 can be cured and provide suitable bond to the incoming, uncured liquid.

In some embodiments, the liquid from second liquid forming block 2008 is intentionally introduced before first tread element 1804 and second tread element 1806 are fully cured. This can be done to promote bonding between the entering liquid and the pre-formed tread elements. This can also be done to provide a tread element with a mixed appearance. In some cases, the mixed tread element may have a swirl or tie dye appearance.

As some additional rubber material may be attached from rubber material that has solidified in first injection cavity 1912 and second injection cavity 1913, some means of removing this excess material may be provided. It is unlikely however that such excess material will interfere with the performance of modified tread assembly 2202. In this embodiment, first tread element cap 2204 and second tread element cap 2206 are rectangular in shape but any shape can be made using modified first lug cavity 2106 and modified second lug cavity 2108. Such shapes may include tetrahedrons, cylinders, or rectangles. Irregular shapes may also be used.

Since the composition of second rubber forming block 2008 may be modified, the composition of first tread element cap 2204 and second tread element cap 2206 can likewise be modified. This is a useful attribute since some tread assemblies may require the use of more durable rubber at their ends, while other tread assemblies may require greater friction at their ends. Embodiments of the process described above can assist in creating these different kinds of tread assemblies.

If second rubber forming block 2008 has a similar material composition as first rubber forming block 1602, it may be difficult to keep the rubber blocks from mixing as the rubber blocks are cured. In particular, if two separate colors are used for first rubber forming block 1602 and second rubber forming block 2006, there may be a mixing of the two colors throughout the newly formed tread element which comprises two layers. In order to provide distinct layers within each tread element, such as distinct colors, it may be preferable to use two different materials, as long as both materials can flow and cure.

Figure 23:
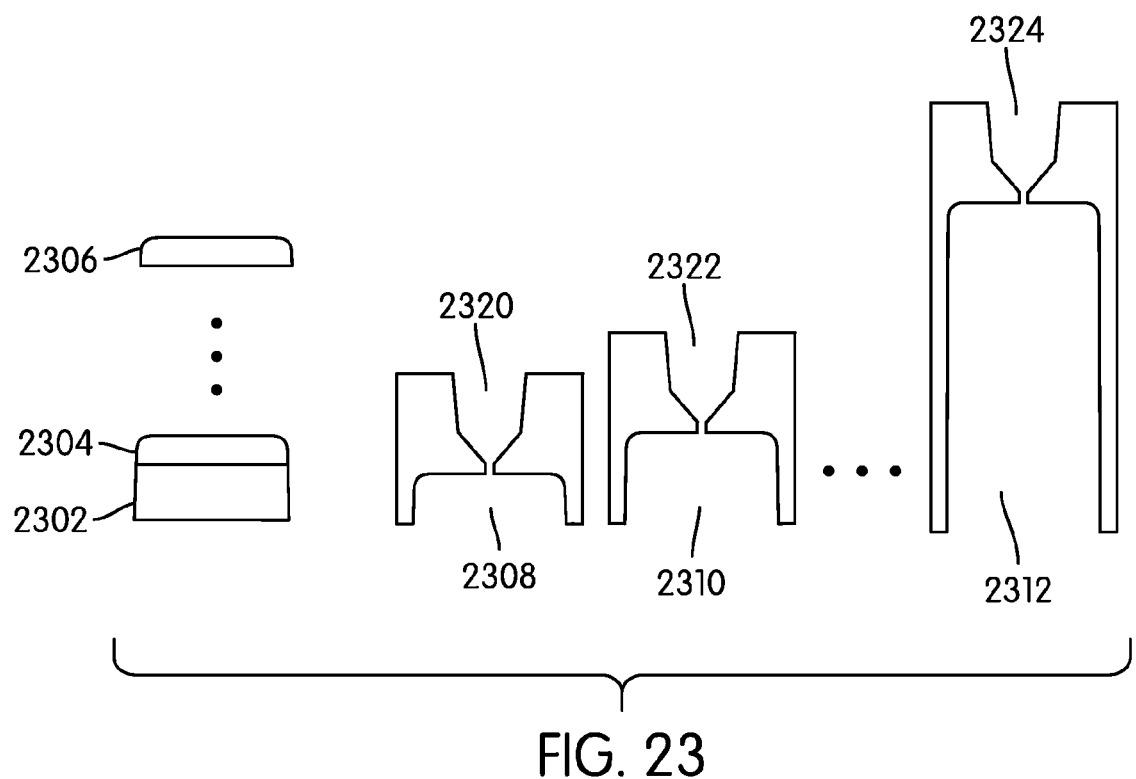
FIG. 23 shows a preferred embodiment of several stacked layers of a tread element and the corresponding lug cavities used to make the tread element.

Although FIG. 22 illustrates two layers for tread elements, there could be more than two layers. In fact, there could be any desired number of layers. This concept can be expressed mathematically, and in some embodiments, there could be up to n layers, where n is any arbitrary number. FIG. 23 shows schematically an embodiment in which there are n layers of the tread elements, where n is arbitrary.

FIG. 23 shows first tread element layer 2302, a second tread element layer 2304, and an nth tread element layer 2306. Also shown in FIG. 23 are the corresponding lug cavities that are used to build the tread element up to the specified layer. Shown in FIG. 23 are a first lug cavity 2308, a second lug cavity 2310, up to an nth lug cavity 2312. Also shown are first injection cavity 2320, second injection cavity 2322 and nth injection cavity 2324 that correspond to their respective lug cavities. It can be observed in FIG. 23 that with each successive lug cavity, the heights of the lug cavities are progressively taller. This allows the successive layers of the tread elements to be added to previous stacks of tread elements.

The preferred order of assembly or manufacture can also be observed in FIG. 23. First tread element layer 2302 has been made by using first lug cavity 2308. Following the creation of first tread element layer 2302, second tread element layer 2304 can be created by using second lug cavity 2310. Since second lug cavity 2310 is slightly larger, leaving a gap inside second lug cavity 2310, second tread element layer 2304 can be created on top of first tread element layer 2302. These steps can be repeated as many times as required to yield a tread element with n layers. Although only lug cavities and injection cavities are shown here, these would be integrated into central molds as shown in the previous embodiments.

Figure 24:
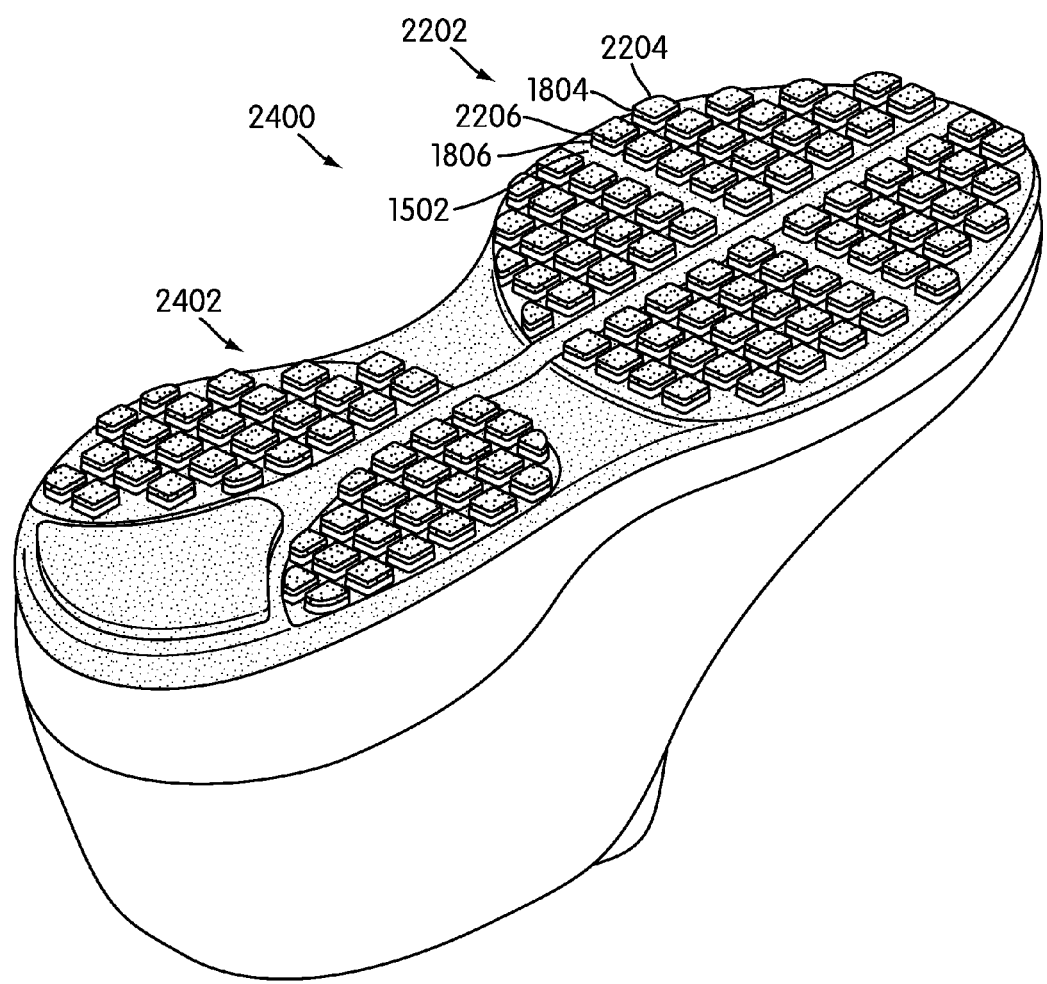
FIG. 24 shows a preferred embodiment of a shoe with tread assembly displayed as an outsole.

FIG. 24 shows a particular embodiment of an article of footwear 2400. Here, modified tread assembly 2202 has been attached to article of footwear 2400 to form tread pattern 2402 of article of footwear 2400. Tread elements are double layered in this example. First tread element 1804 and first tread element cap 2204 are seen adjacent to second tread element 1806 and second tread element cap 2206. Matrix lining 1502 of modified tread assembly 2202 is fixed directly to article of footwear 2400. Tread elements and tread element caps may be formed into any size or shape, and may be comprised of any color or material.

Figure 25:
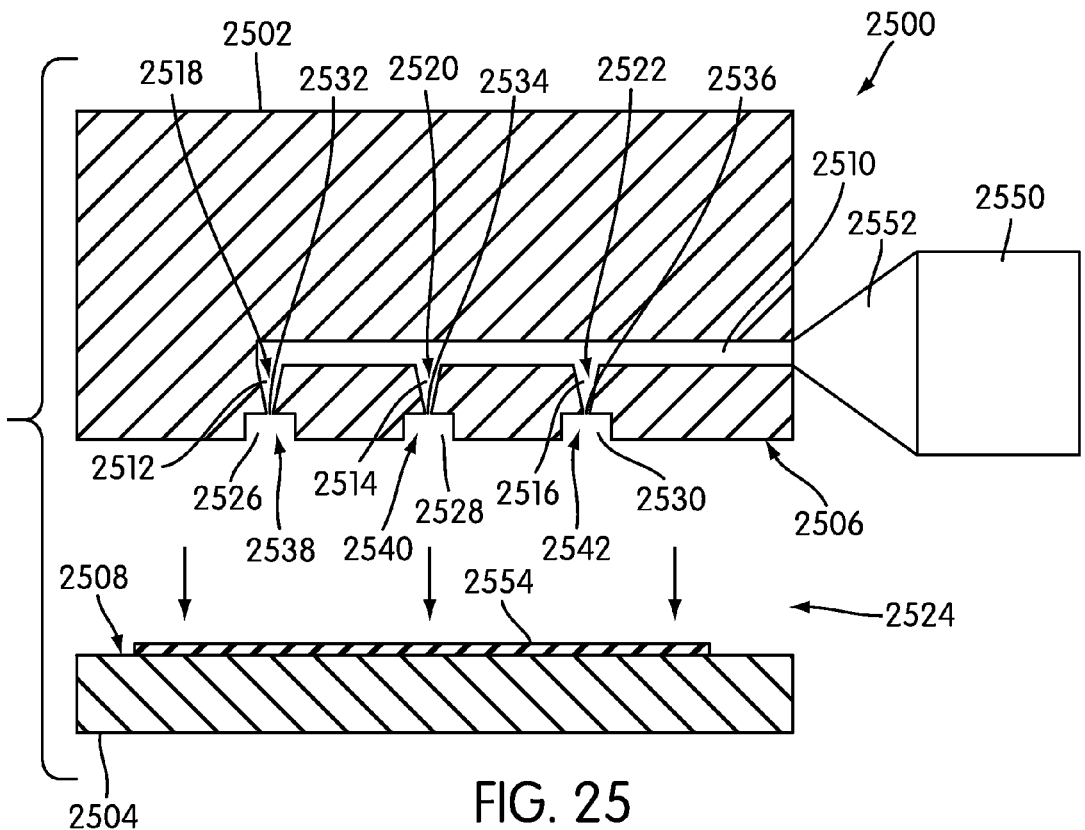
FIG. 25 is a schematic diagram of a possible embodiment of a manufacturing system used to create a tread assembly.

FIG. 25 is a schematic diagram of a possible embodiment of a manufacturing system 2500 used to create a tread assembly. In this embodiment, rubber blocks that form the starting material in other embodiments are replaced with liquefied material that is directly injected into a lug cavity. Manufacturing system 2500 includes upper mold 2502 and molding base 2504. A first side 2506 of upper mold 2502 is preferably disposed adjacent to a first side 2508 of molding base 2504.

Upper mold 2502 preferably includes injection channel 2510. Upper mold 2502 also preferably includes first injection cavity 2512, second injection cavity 2514, and third injection cavity 2516. In a preferred embodiment, first injection cavity 2512 is in fluid communication with injection channel 2510 via first upper orifice 2518. Likewise, second injection cavity 2514 is preferably in fluid communication with injection channel 2510 via second upper orifice 2520. Likewise, third injection cavity 2516 is preferably in fluid communication with injection channel 2510 via third upper orifice 2522.

Upper mold 2502 also preferably includes first lug cavity 2526, second lug cavity 2528, and third lug cavity 2530. First lug cavity 2526 is preferably in fluid communication with first injection cavity 2512 via first lower orifice 2532. This arrangement allows a liquid or viscous substance to pass between first injection cavity 2512 and first lug cavity 2526. Second lug cavity 2528 is preferably in fluid communication with second injection cavity 2520 via second lower orifice 2534. This arrangement allows a liquid or viscous substance to pass between second injection cavity 2514 and second lug cavity 2528. Similarly, third lug cavity 2530 is preferably in fluid communication with third injection cavity 2522 via third lower orifice 2536. This arrangement allows a liquid or viscous substance to pass between third injection cavity 2516 and third lug cavity 2530. In addition, first lug cavity 2526, second lug cavity 2528, and third lug cavity 2530 are all preferably exposed to gap 2524 via first lug opening 2538, second lug opening 2540, and third lug opening 2542 respectively.

Manufacturing system 2500 preferably includes screw injection machine 2550. Screw injection machine 2550 is preferably capable of pumping or moving liquefied material through injection channel 2510. In some embodiments, screw injection machine 2550 may include provisions to heat its liquefied contents. To move liquefied material to the various lug cavities, screw injection machine 2550 is preferably in fluid communication with injection channel 2510 via intermediate channel 2552.

The distance between molding base 2504 and upper mold 2502 may be varied. In some embodiments, molding base 2504 may be moved to contact upper mold 2402. However, in other embodiments, upper mold 2502 may be moved to contact molding base 2504. In some embodiments, the items comprising manufacturing system 2500 may be made of a metallic material.

In the embodiment shown in FIG. 25, only three injection and lug cavities are shown, however in some embodiments many more injection and lug cavities may be included. In particular, first injection cavity 2512, second injection cavity 2514, and third injection cavity 2516 may be associated with a set of injection and lug cavities that may extend in the direction perpendicular (in and out of the plane of the page) to molding system 2500 as seen in FIG. 25.

In the embodiment shown in FIG. 25, first lug cavity 2526, second lug cavity 2528, and third lug cavity 2530 are rectangular, however these cavities can assume any shape including, but not limited to, typical shapes found on the outsoles of articles of footwear.

Manufacturing system 2500 also preferably includes provisions to accommodate or receive a matrix lining 2554. Matrix lining 2554 is preferably placed on molding base 2504. Matrix lining 2554 may be placed on molding base 2504 by sliding matrix lining 2554 into place, through gap 2524, or by first moving molding base 2504 away from upper mold 2502 and then returning molding base 2504 after matrix lining 2554 has been added. It may be preferable to fix matrix lining 2554 in place to assure proper alignment with first lug cavity 2526, second lug cavity 2528, and third lug cavity 2530. In some embodiments, matrix lining 2554 may be clamped down to molding base 2504 or held down with an adhesive.

Figure 26:
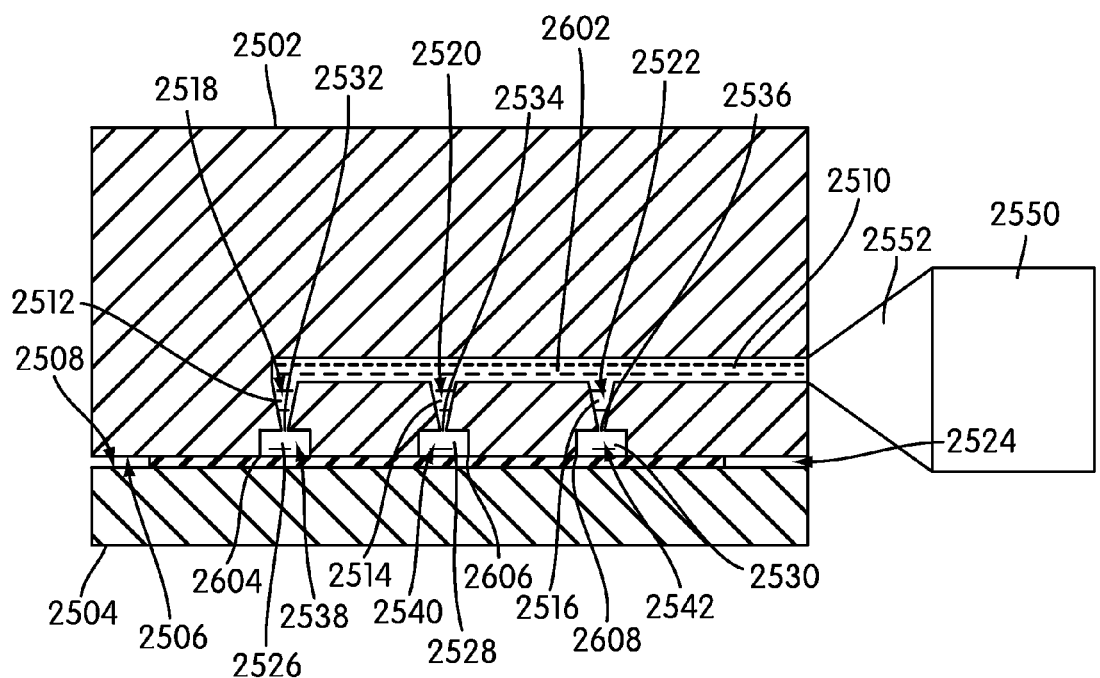
FIG. 26 is a schematic diagram of a preferred embodiment of another step in the manufacturing process associated with the system of FIG. 25, in which the upper mold and the molding base are brought together and viscous material is injected.

FIG. 26 is a preferred embodiment of another step in the manufacturing process, where the movement of upper mold 2502 towards molding base 2504 is accomplished. In some embodiments, portions of upper mold 2502 will be in contact with molding base 2504 after this movement step. Preferably, molding base 2504 will be positioned with respect to upper mold 2502 in such a way that matrix lining 2554 is exposed to first lug cavity 2526, second lug cavity 2528, and third lug cavity 2530.

During this step, a viscous material 2602 flows from screw injection machine 2550, through intermediate channel 2552, into injection channel 2510. From injection channel 2510, viscous material 2602 flows into first injection cavity 2512, second injection cavity 2514, and third injection cavity 2516. Viscous material 2602 then flows into first lug cavity 2526, second lug cavity 2528, and third lug cavity 2530. It is also possible to pre-position viscous material 2602 so that viscous material 2602 is near or in the injection cavities 2512, 2514 and 2516. To prevent the premature curing of viscous material 2602, upper mold 2502 may include provisions to heat viscous material 2602.

In a preferred embodiment of manufacturing system 2500, first lug cavity rim 2604, which preferably extends around the entire outer periphery of first lug cavity 2526, is preferably in contact with matrix lining 2554 under enough pressure so that no viscous material escapes the region enclosed by first lug cavity rim 2604. In a similar manner, second lug cavity rim 2606, which preferably extends around the entire outer periphery of second lug cavity 2528, is preferably in contact with matrix lining 2554 under enough pressure so that no viscous material escapes the region enclosed by second lug cavity rim 2606. In a similar manner, third lug cavity rim 2608, which preferably extends around the entire outer periphery of third lug cavity 2530, is preferably in contact with matrix lining 2554 under enough pressure so that no viscous material escapes the region enclosed by third lug cavity rim 2608.

Figure 27:
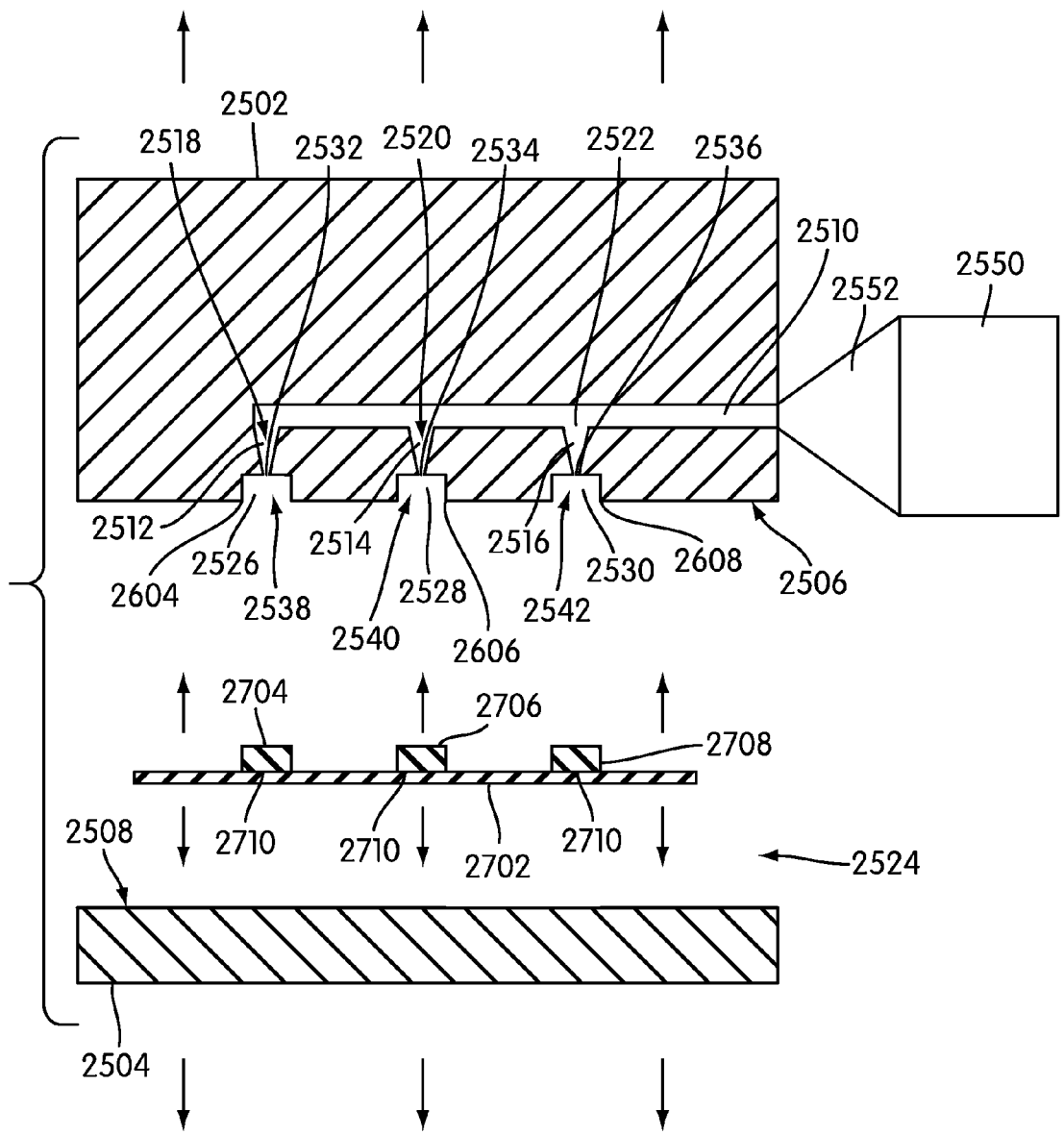
FIG. 27 is a schematic diagram of an embodiment of another step in the manufacturing process associated with the system of FIG. 25, in which the upper mold and the molding base are separated, yielding a tread assembly.

Once viscous material 2602 has cooled, upper mold 2502 can be separated from molding base 2504, yielding tread assembly 2702, seen in FIG. 27. This separation can be performed by either lowering molding base 2504 or by raising upper mold 2502. What remains is tread assembly 2702, which includes matrix lining 2554 adjoined with first tread element 2704, second tread element 2706, and third tread element 2708. First tread element 2704 preferably includes a base 2710 that is preferably no larger than the width of first lug cavity rim 2604. Second tread element base 2712 of second tread element 2706 is preferably no larger than the width of second lug cavity rim 2606, and third tread element base 2714 of third tread element 2708 is preferably no larger than the width of third lug cavity rim 2608.

As some additional rubber material may be attached from viscous material that has solidified in first injection cavity 2512, second injection cavity 2514, and third injection cavity 2616, some means of removing this excess material may be provided. It is unlikely however that such excess material will interfere with the performance of tread assembly 2702. In this particular embodiment, first tread element 2704, second tread element 2706, and third tread element 2708 are rectangular in shape but any shape can be made using first lug cavity 2526, second lug cavity 2528, and third lug cavity 2530. Such shapes may include tetrahedrons, cylinders, or rectangles. Irregular shapes may also be used.

The size of lug cavities is also unrestricted in this method. Although first lug cavity 2526, second lug cavity 2528, and third lug cavity 2530 are identical in size and shape, this need not be true in other embodiments. Some embodiments may have lug cavities in a variety of shapes and sizes and lug cavities that are different from one another.

Tread assembly 2702, as seen in FIG. 27, includes only three tread elements. In other embodiments, tread assembly 2702 may comprise a matrix lining with multiple tread elements. These tread elements could be simultaneously formed and joined to a matrix lining by modification of upper mold 2502 to include multiple injection cavities and lug cavities. Tread assembly 2702 may be subsequently attached to the outsole of an article of footwear in a substantially similar manner as has been shown in previous embodiments.

Using this manufacturing process 2500, precise amounts of viscous material 2602 can be dispensed and waste of viscous material 2602 can be dramatically reduced. This manufacturing process 2500 also can increase the speed of production by eliminating the step of placing a rubber forming block.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of making tread elements for an article of footwear, comprising the steps of:
    pressing a matrix lining against a molding base by applying pressure from a first lug cavity rim and a second lug cavity rim on a first side of a central mold;
    placing a first rubber block and a second rubber block between a molding press and a second side of the central mold;
    compressing the first rubber block and the second rubber block between the molding press and the second side of the central mold, so that the first rubber block and the second rubber block liquefy;
    pressing the first lug cavity rim into the matrix lining to permanently form in the matrix lining a first outer periphery indentation having an inside perimeter and an outside perimeter;
    pressing the second lug cavity rim into the matrix lining to permanently form in the matrix lining a second outer periphery indentation having an inside perimeter and an outside perimeter;
        wherein first material associated with the first rubber block flows through a first injection cavity disposed in the central mold, the first injection cavity being in fluid communication with a first lug cavity;
        wherein second material associated with the second rubber block flows through a second injection cavity disposed in the central mold, the second injection cavity being in fluid communication with a second lug cavity;
    preventing, by pressing the first lug cavity rim into the matrix lining, the first material from escaping from the first lug cavity into the first outer periphery indentation; and
    preventing, by pressing the second lug cavity rim into the matrix lining, the second material from escaping from the second lug cavity into the second outer periphery indentation;
    wherein a first tread element formed by the first material has a base defined by the size and shape of the first lug cavity rim and is spaced from a second tread element formed by the second material having a base defined by the size and shape of the second lug cavity rim;
    wherein the base of the first tread element is disposed within the inside perimeter of the first outer periphery indentation and the base of the second tread element is disposed within the inside perimeter of the second outer periphery indentation; and
    wherein the matrix lining is exposed between the first tread element and the second tread element.

2. The method according to claim 1, wherein the first material is different than the second material.

3. The method according to claim 1, wherein the first material has a different color than the second material.

4. The method according to claim 1, wherein the first material and the second material are compressed simultaneously by the same molding press.

5. The method according to claim 1, wherein the first material and the second material eventually form first and second tread elements, respectively, after the matrix lining is separated from the central mold.

6. The method of claim 1, wherein the central mold comprises a first central mold, and wherein the method further comprises:
    removing the first central mold from the matrix lining;
    positioning a second central mold over the matrix lining, the second central mold having a third lug cavity rim and a fourth lug cavity rim substantially the same size and shape as the first lug cavity rim and the second lug cavity rim, respectively;
    aligning the third lug cavity rim and the fourth lug cavity rim with the first outer periphery indentation and the second outer periphery indentation, respectively; and
    pressing the third lug cavity rim and the fourth lug cavity rim into the first outer periphery indentation and the second outer periphery indentation, respectively.

7. A method of making a tread assembly, comprising:
placing a matrix lining onto a molding base;
positioning a first rubber block in a first central cavity in a central mold;
positioning a second rubber block in a second central cavity in a central mold;
wherein the first rubber block has a first characteristic and the second rubber block has a second characteristic different from the first characteristic;
positioning the central mold adjacent the molding base such that a first lug cavity rim presses into the matrix lining in a first location to permanently form a first outer periphery indentation having an inside perimeter and an outside perimeter, and such that a second lug cavity rim presses into the matrix lining in a second location spaced from the first location to permanently form a second outer periphery indentation having an inside perimeter and an outside perimeter, each pressing having adequate pressure to prevent escape of excess material;
liquefying each rubber block by compressing and heating;
pressing each rubber block through a respective injection cavity into a respective lug cavity to form tread elements, wherein a first tread element is disposed within the inside perimeter of the first outer periphery indentation and a second tread element is disposed within the inside perimeter of the second outer periphery indentation;
gathering escaped excess material from each rubber block in a respective molding recess;
cooling and resolidifying the tread elements; and
separating the central mold from the molding base to release the tread assembly.

8. The method of claim 7, further comprising a spring positioned adjacent the central mold to release excess pressure from excess material.

9. The method of claim 7, wherein the first and second rubber blocks differ in color.

10. The method of claim 7, wherein the first and second rubber blocks differ in flexibility.

11. The method of claim 7, wherein the central mold comprises a first central mold, and wherein the method further comprises:
positioning a second central mold over the matrix lining, the second central mold having a third lug cavity rim and a fourth lug cavity rim substantially the same size and shape as the first lug cavity rim and the second lug cavity rim, respectively;
aligning the third lug cavity rim and the fourth lug cavity rim with the first outer periphery indentation and the second outer periphery indentation, respectively; and
pressing the third lug cavity rim and the fourth lug cavity rim into the first outer periphery indentation and the second outer periphery indentation, respectively.

12. A method of making a tread assembly, comprising:
placing a matrix lining onto a molding base;
positioning a first plurality of rubber blocks in a first plurality of central cavities in a first central mold;
positioning the first central mold adjacent the molding base such that each first lug cavity rim defining a first lug cavity presses into the matrix lining in a first location to permanently form in the matrix lining an outer periphery indentation having an inside perimeter and an outside perimeter, the pressing having adequate pressure to prevent escape of excess material;
liquefying the plurality of first rubber blocks by compressing and heating;
pressing the plurality of first rubber blocks through a corresponding plurality of first injection cavities into a corresponding first lug cavity having a first height to form a plurality of tread elements;
gathering escaped excess material from the first rubber blocks in a plurality of first molding recesses;
cooling and resolidifying the tread elements;
separating the first central mold from the molding base, the molded tread elements each having a tread element base that has a shape and size defined by the shape and size of the corresponding first lug cavity rim and that is disposed within the inside perimeter of the outer periphery indentation;
positioning a plurality of second rubber blocks into a second plurality of central cavities in a second central mold;
positioning the second central mold adjacent the molding base such that each second lug cavity rim defining a second lug cavity presses into the matrix lining in a corresponding first location, the second lug cavity rim fitting inside the outer periphery indentation, and the pressing having adequate pressure to prevent escape of excess material;
liquifying the plurality of second rubber blocks by compressing and heating;
pressing the plurality of second rubber blocks through a plurality of second injection cavities into corresponding second lug cavities having a second height to form a second layer on each of the plurality of tread elements;
gathering escaped excess material from the second rubber blocks in corresponding second molding recesses;
cooling and resolidifying the tread elements;
separating the second central mold from the molding base to create a tread assembly of spaced tread elements; and
wherein each corresponding second lug cavity rim and first lug cavity rim are substantially the same shape and size and where the second height is larger than the first height.

13. The method of claim 12, wherein each first rubber block has a first characteristic and each second rubber block has a second characteristic different from the first characteristic of the corresponding first rubber block.

14. The method of claim 13, wherein the first rubber block is a different color from the second rubber block.

15. The method of claim 13, wherein the first rubber block and the second rubber block differ in flexibility.

16. The method of claim 12, further comprising the steps of:
positioning a plurality of third rubber blocks into a corresponding plurality of third central cavity in a third central mold;
positioning the third central mold adjacent the molding base such that each third lug cavity rim defining a third lug cavity presses into the matrix lining in a corresponding first location, the third lug cavity rim fitting inside the outer periphery indentation, and the pressing having adequate pressure to prevent escape of excess material;
liquifying the plurality of third rubber blocks by compressing and heating;
pressing the plurality of third rubber blocks through a corresponding plurality of third injection cavities into a corresponding plurality of third lug cavities having a third height to form a third layer on each of the plurality of tread elements;
gathering escaped excess material from the third rubber blocks in a plurality of third molding recesses;
cooling and resolidifying the tread elements;

separating the second central mold from the molding base to create a tread assembly of spaced tread elements; and wherein the third lug cavity rim and the first lug cavity rim are substantially the same shape and size and wherein the third height is larger than the second height.

17. The method of claim 16, wherein each first rubber block has a first characteristic, each corresponding second rubber block has a second characteristic different from the first characteristic, and each corresponding third rubber block has a third characteristic different from at least one of the first characteristic and the second characteristic.

18. The method of claim 17, wherein the third rubber block is a different color from at least one of the first rubber block and the second rubber block.

19. The method of claim 17, wherein the third rubber block differs in flexibility from at least one of the first rubber block and the second rubber block.

20. The method of claim 12, further comprising:

forming a matrix lining protrusion inside a first lining recess of the first central mold, wherein the matrix lining protrusion is adjacent to the first outer periphery indentation; and aligning the matrix lining protrusion within a second lining recess of the second central mold to align the matrix lining with the second central mold.

\* \* \* \* \*